United States Patent
Wilbert et al.

(10) Patent No.: US 10,536,809 B1
(45) Date of Patent: Jan. 14, 2020

(54) SYSTEM AND METHOD FOR DETECTION OF A STRUCTURE

(71) Applicant: HOMERUN LABS, INC., Denver, CO (US)

(72) Inventors: Anthony Russell Wilbert, Denver, CO (US); Jacob Alter Lozow, Denver, CO (US)

(73) Assignee: HOMERUN LABS, INC., Denver, CO (US)

( * ) Notice: Subject to any disclaimer, the term of this patent is extended or adjusted under 35 U.S.C. 154(b) by 0 days.

(21) Appl. No.: 16/022,518

(22) Filed: Jun. 28, 2018

(51) Int. Cl.
| | |
|---|---|
| *H04W 4/02* | (2018.01) |
| *G06T 7/20* | (2017.01) |
| *G01S 19/13* | (2010.01) |
| *G01C 21/12* | (2006.01) |
| *G06T 7/73* | (2017.01) |
| *H04W 84/12* | (2009.01) |

(52) U.S. Cl.
CPC ............ *H04W 4/026* (2013.01); *G01C 21/12* (2013.01); *G01S 19/13* (2013.01); *G06T 7/20* (2013.01); *G06T 7/74* (2017.01); *H04W 84/12* (2013.01)

(58) Field of Classification Search
CPC ....... H04W 4/026; H04W 4/02; H04W 4/043; G01C 21/12; G01S 19/13
See application file for complete search history.

(56) References Cited

U.S. PATENT DOCUMENTS

| | | | | |
|---|---|---|---|---|
| 8,396,265 | B1* | 3/2013 | Ross | G06K 9/00214 |
| | | | | 382/103 |
| 9,317,966 | B1* | 4/2016 | Deephanphongs | G06T 17/00 |
| 2011/0193985 | A1* | 8/2011 | Inoue | H04N 5/23216 |
| | | | | 348/222.1 |
| 2012/0105475 | A1* | 5/2012 | Tseng | G01C 21/3611 |
| | | | | 345/633 |
| 2013/0090133 | A1* | 4/2013 | D' Jesus Bencci | H04W 4/028 |
| | | | | 455/456.2 |
| 2013/0332482 | A1* | 12/2013 | Son | G06F 17/30277 |
| | | | | 707/769 |
| 2014/0115140 | A1* | 4/2014 | Jin | G06K 9/00671 |
| | | | | 709/223 |
| 2015/0310556 | A1* | 10/2015 | Kiper | G06Q 30/0283 |
| | | | | 705/4 |

* cited by examiner

*Primary Examiner* — Kathy W Wang-Hurst
*Assistant Examiner* — Ernest G Tacsik
(74) *Attorney, Agent, or Firm* — Arent Fox LLP

(57) ABSTRACT

In an aspect of the disclosure, a method, a computer-readable medium, and an apparatus are provided. The apparatus may include an imager, an inertial measurement unit, and a processing system. The imager may be configured to capture an image. The inertial measurement unit may have an output. The processing system may be configured to collect positional information indicating a position of the computing device in response to the output from the inertial measurement unit. Further, the processing system may be configured to determine a selected structure captured in the image. Further, the processing system may be configured to identify information corresponding to the selected structure based on the positional information.

11 Claims, 19 Drawing Sheets

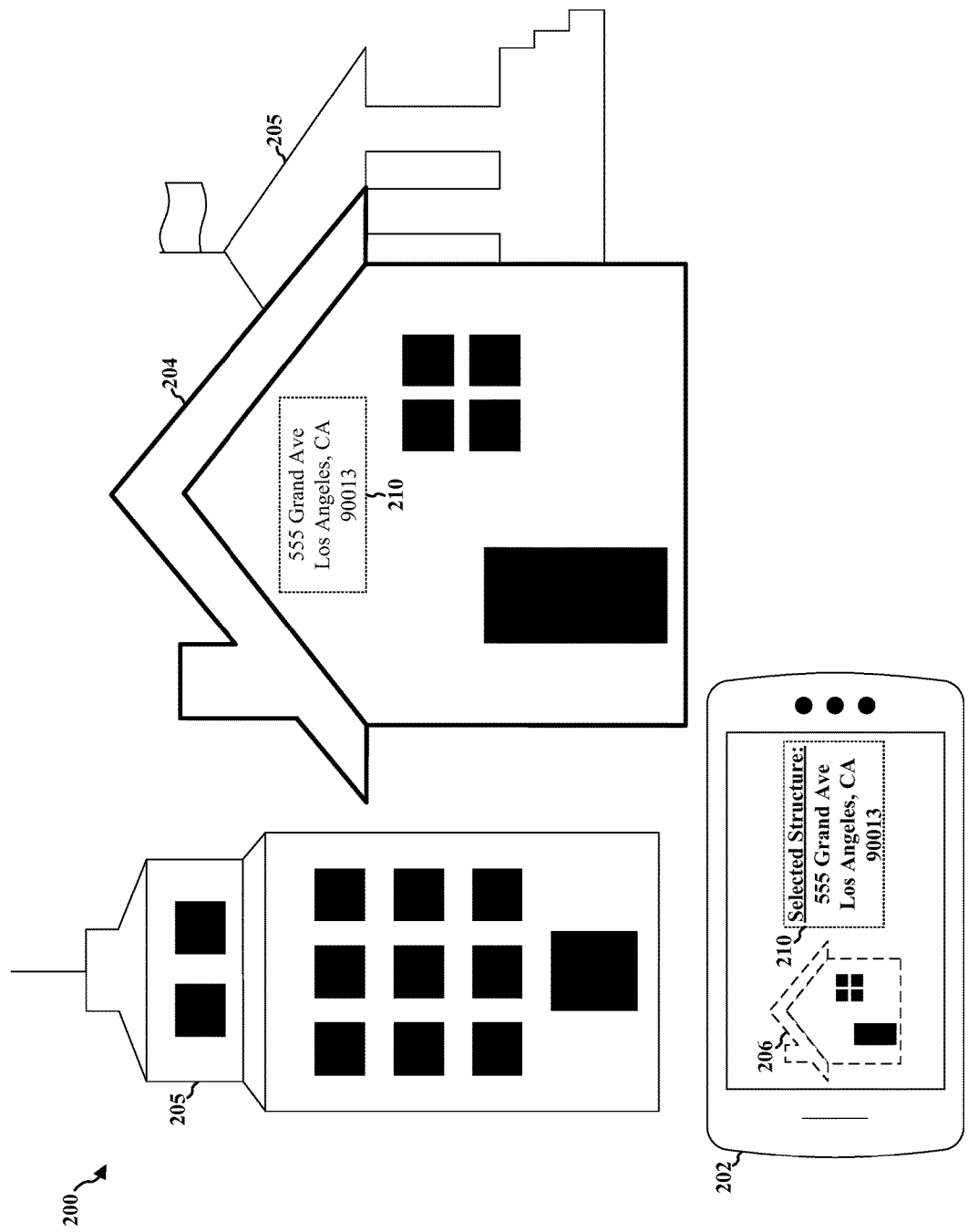

SYSTEM AND METHOD FOR DETECTION OF A STRUCTURE

BACKGROUND

Technical Field

The present disclosure relates generally to communication systems, and more particularly, to a device configured to identify a structure that is proximate to the device.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Typically, systems and devices include a component for determining a position of the device, such as a Global Positioning System (GPS). Such components may only return an approximation of the position of the device. Moreover, such components lack information about the environment surrounding the device.

Therefore, there exists a need for an accurate approach to provide a device information about the environment surrounding the device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include an imager, an inertial measurement unit, and a processing system. The imager may be configured to capture an image. The inertial measurement unit may have an output. The processing system may be configured to collect positional information indicating a position of the computing device in response to the output from the inertial measurement unit, determine a selected structure captured in the image, and identify information corresponding to the selected structure based on the positional information.

In one aspect, the positional information indicating the position of the computing device comprises at least one of geographic coordinates associated with the position of the computing device, a first orientation of the computing device relative to magnetic north, or a rotational orientation of the computing device.

In one aspect, the collection of the positional information indicating the position of the computing device comprises at least one of to: receive the geographic coordinates associated with the position of the computing device using a Global Navigation Satellite System (GNSS) component of the computing device; or determine the geographic coordinates associated with the position of the computing device based on signals received from at least one WiFi access point (AP) over a WiFi network. In one aspect, the collection of the positional information indicating the position of the computing device comprises at least one of to: determine the first orientation of the computing device relative to the magnetic north; or determine the rotational orientation of the computing device.

In one aspect, the determination of the selected structure that is proximate to the position of the computing device comprises to: determine a line of sight that is orthogonal to a camera lens of the computing device based on at least one of the first orientation of the computing device or the rotational orientation of the computing device; and identify the selected structure based on the line of sight.

In one aspect, the processing system is further configured to: send, to a remote server, at least a portion of the positional information indicating the position of the computing device; and receive regional information associated with a first parcel associated with a first structure from the remote server based on the at least a portion of the positional information, the regional information indicating at least one of: first parcel information indicating a geographic position associated with the first parcel, first footprint information indicating a geographic position associated with the first structure, first building envelope information associated with the first structure, a first elevation associated with the position of the computing device, a first geographic map that includes the first parcel, a first image that includes at least a portion of the first structure, or first address information associated with the first structure.

In one aspect, the processing system is further configured to verify whether the identified information comprises the first address information based on the regional information. In one aspect, the verification of the identified information comprises to: compare the image that includes at least a portion of the selected structure with the first image that includes at least a portion of the first structure; and determine whether the at least the portion of the selected structure included in the image corresponds with the at least the portion of the first structure included in the first image, wherein the identified information comprises the first address information when the at least the portion of the selected structure included in the image corresponds with the at least the portion of the first structure included in the first image. In one aspect, the verification of the identified information comprises to: compare a measured elevation associated with the computing device with the first elevation; and determine whether the measured elevation corresponds with the first elevation, wherein the identified information comprises the first address information when the measured elevation corresponds with the first elevation.

In one aspect, the verification of the identified information comprises to: estimate at least one parcel line based on the first parcel information; determine whether the selected structure is within the estimated at least one parcel line, wherein the identified information comprises the first address information when the selected structure is determined to be within the estimated at least one parcel line.

In one aspect, the verification of the identified information comprises to: measure a first distance between the position of the computing device and a focal point within a field of view of the imager on a selected structural wall of the selected structure; determine a point position on a known structural wall that corresponds to the focal point, the known structural wall being indicated by at least one of the first footprint information or the first building envelope information; determine a second distance between the point position and the positional information indicating the position of the computing device; and determine whether the first distance corresponds with the second distance, wherein the identified information comprises the first address information when the first distance is determined to correspond with the second distance.

In one aspect, the processing system is further configured to: change the identified information when the identified information is unverified to comprise the first address information; and determine whether the changed identified information comprises the first address information based on the regional information. In one aspect, the processing system is further configured to: store, in memory of the computing device, at least a portion of the regional information, wherein the regional information further indicates at least one of: second parcel information indicating a second geographic position associated with a second parcel, second footprint information indicating a second geographic position associated with a second structure of the second parcel, second building envelope information associated with the second structure, a second elevation associated with the position of the computing device, a second geographic map that includes the second parcel, a second image that includes at least a portion of the second structure, or second address information associated with the second structure. In one aspect, the processing system is further configured to: determine a second selected structure that is proximate to the position of the computing device; and identify, based on the regional information and based on the positional information indicating the position of the computing device, second information corresponding to the second selected structure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2 is a block diagram illustrating an example of an environment in which a computing device may be positioned.

DETAILED DESCRIPTION

Figure 1:
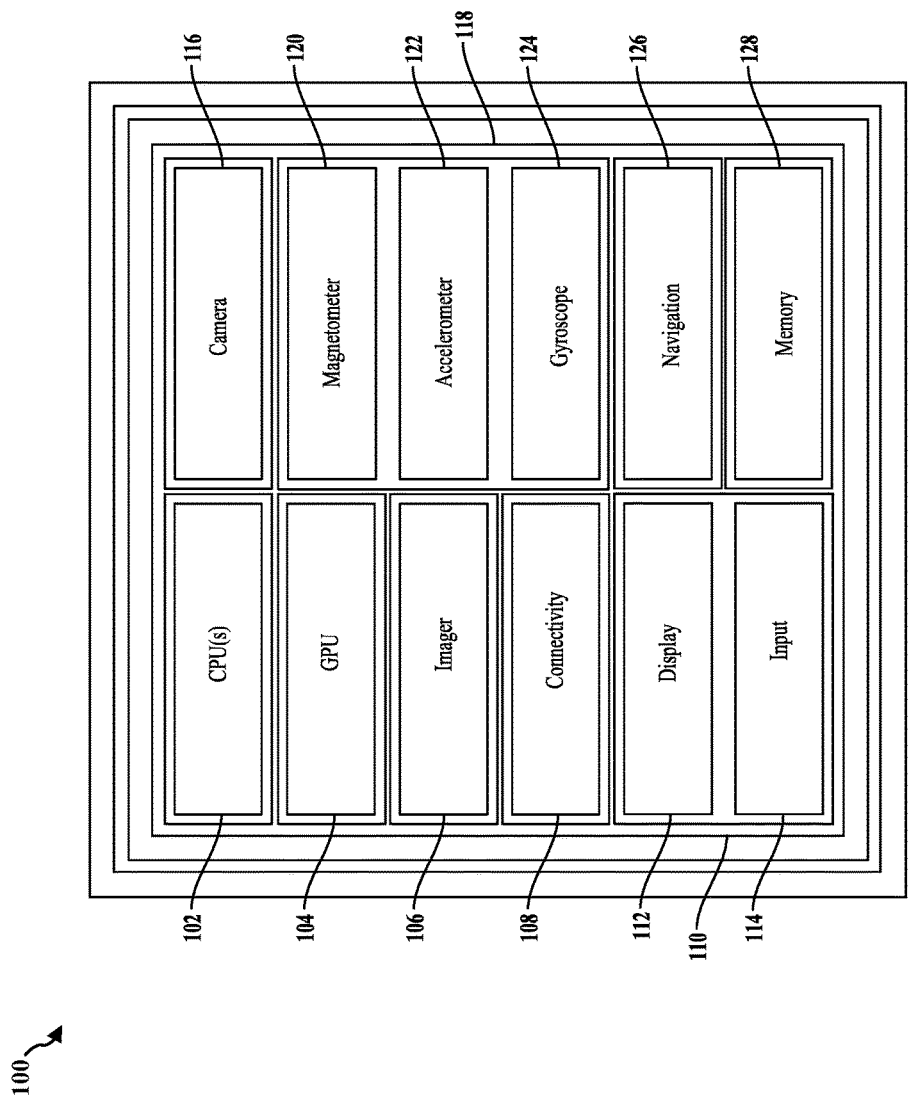
FIG. 1 is a block diagram illustrating an example of a computing device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computing device.

FIG. 1 is a diagram illustrating an example of a wireless communications device 100. The wireless communications device 100 may be, for example, a smart phone, a cellular phone, a smart phone, a session initiation protocol (SIP) phone, a laptop, a personal digital assistant (PDA), a multimedia device, a video device, a tablet, a smart device, a wearable device, or any other similar functioning device. In one example, a smart device and/or wearable device may include smart glasses and/or smart spectacles.

The device 100 may include a plurality of units. In one aspect, the units of the device 100 may be implemented as a system-on-chip (SoC). Various units of the device 100 may be implemented as hardware, software, firmware, middleware, microcode, and/or a combination of the aforementioned examples. For example, the user interface 110 may include a combination the aforementioned examples.

The device 100 may include one or more processors, such as the central processing unit(s) 102. For example, the CPU(s) 102 may include one or more general-purpose processors, multi-core processors, microprocessors, and so forth. The CPU(s) 102 may be configured to execute instructions loaded from memory 128, such a reduced instruction set computing (RISC) instruction set and/or Advanced RISC Machine (ARM) instruction set. In various aspects, the CPU(s) 102 may be configured to execute software, such as software loaded into memory 128 (e.g., an application loaded into memory 128). For example, an address detector may be loaded into memory 128.

The device 100 may include memory 128. By way of example, memory 128 may include RAM, ROM, EEPROM, optical disk storage, magnetic disk storage, other magnetic storage devices, a flash memory device, a removable memory device, and/or combinations of types of memory, and/or any other memory that can be used to store software (e.g., software in the form of instructions or data structures that can be accessed by the CPU(s) 102).

The device 100 may include at least one GPU 104. The GPU 104 may be configured to process software loaded into memory 128. For example, the GPU 104 may be configured to process instructions accessible from memory 128 in order to present images (e.g., still images, video, visual user interface, etc.) on a display 112 of the device 100.

In various aspects, the device 100 may be configured for wireless communication. Accordingly, the device 100 may include a connectivity unit 108. The connectivity unit 108 may be configured for essentially any type of wireless communication. For example, the connectivity unit 108 may be configured for communication over a radio access network (RAN), a personal area network (PAN), a wireless local area network (WLAN), a Worldwide Interoperability for Microwave Access (WiMax) network, or another wireless network. In one example, the connectivity unit 108 may be configured for communication over a 4G Long Term Evolution (LTE) network, a 5G New Radio (NR), or another cellular network. In another example, the connectivity unit 108 may be configured for communication over a WiFi network (e.g., in an unlicensed spectrum).

The connectivity unit 108 may be configured to facilitate wireless communication of data to and from an application (e.g., of an application layer of the device 100), the instructions of which may be loaded into memory 128. In various aspects, the connectivity unit may include one or more of a network interface, a digital signal processor (DSP), an analog-to-digital convertor (ADC), a digital-to-analog convertor (DAC), a radio frequency (RF) front end, and the like.

The device 100 may further include a user interface 110. The user interface 110 may include one or more units that facilitate interaction with the device 100 by a user. In an aspect, the user interface 110 may include a display 112 configured to present visual output, e.g., from the application. In an aspect, the user interface 110 may include an input unit 114. The input unit 114 may be configured to receive input from a user and provide the received input to the application. For example, the input unit 114 may include a touchscreen, a keyboard, one or more tactile buttons, one or more microphones for voice input, and/or another unit configured to receive user input, and/or a combination of aforementioned components.

In some aspects, the user interface 110 may further include a speaker. Accordingly, the user interface 110 may be configured to output audio signals. In some aspects, the user interface 110 may further include a microphone. Accordingly, the user interface 110 may be configured to receive input as audio signals (e.g., voice input received from a user of the device 100). In some aspects, the user interface 110 may include one or more additional units. In some aspects, the user interface 110 may omit one or more of the aforementioned units.

In various aspects, the device 100 may further include at least one camera 116. The camera 116 may be configured to capture images and/or video, and may store captured images and/or video in memory 128. In various aspects, the camera 116 may detect image data (e.g., still frames, video, etc.). The camera 116 may include an image sensor. The image sensor may be disposed behind at least one lens. A line of sight of the camera 116 may be a line that is orthogonal to the at least one lens of the camera 116. The camera 116 may detect image data representing the area that surrounds the line of sight and is bounded by the field of view (e.g., the area surrounding the line of sight that is detectable by the image sensor).

The camera 116 may be coupled with an imager 106. The imager 106 may include an image processor. The imager 106 may obtain image data from the camera 116 and cause a representation of the image data to be presented on the display 112. In various aspects, the camera 116 may contemporaneously detect image data, and the imager 106 may cause the image data to be presented on the display 112. For example, the camera 116 may detect image data, and the imager 106 may cause the display 112 to present image data that depicts the immediate environment surrounding the device 100 that is within the field of view of the camera 116.

In various aspects, the device 100 may further include at least one inertial measurement unit (IMU) 118. The IMU 118 may be configured to measure a specific force, angular rate, and/or magnetic field associated with the device 100. For example, the IMU 118 may measure the specific force (e.g., acceleration, rate of change of velocity, etc.) experienced by the device 100. In another example, the IMU 118 may measure the one or more degrees of freedom associated with the device 100. In another example, the IMU 118 may measure the magnetic field surrounding the device 100.

In one aspect, the IMU 118 may be configured to measure a compass orientation of the device 100, which may include an orientation of the device 100 relative to North (e.g., magnetic north). The compass orientation of the device 100 may be with respect to a front face, top face, and/or leading edge of a housing of the device 100. In some aspects, the compass orientation of the device 100 may be indicated as a compass coordinate, a directional bearing, a heading, or the like.

In one aspect, the IMU 118 may be configured to measure the acceleration (e.g., rate of change of velocity) of the device 100, e.g., relative to a rest frame associated with the device 100. For example, the IMU 118 may measure linear acceleration.

In one aspect, the IMU 118 may be configured to measure an orientation, angular rate, and/or angular velocity of the device 100. In an aspect, the IMU 118 may measure velocity and/or acceleration in one or more degrees of freedom (e.g., six degrees of freedom). For example, the IMU 118 may measure orientation through rotation, e.g., one or more values indicating pitch (e.g., position about a lateral axis), roll (e.g., position about a longitudinal axis), and/or yaw (e.g., position about a normal axis). In another example, the IMU 118 may measure change in position, e.g., one or more values indicating surge (e.g., position with respect to forward/backward), heave (e.g., position with respect to up/down), and/or sway (e.g., position with respect to left/right).

Illustratively, the IMU 118 may determine and/or output information indicating a rotational orientation of the device. For example, the rotational orientation may indicate when the device 100 is vertically oriented, e.g., approximately perpendicular relative to a horizon plane, such as when the device 100 is held vertically by a user, when the device 100 is oriented with the line of sight approximately parallel to the horizon plane, etc. Similarly, the rotational orientation may indicate when the device 100 is horizontally oriented, e.g., so that the device 100 is approximately parallel relative to the horizon plane, such as when the device 100 is horizontally held by a user, when the device 202 is oriented with the line of sight approximately perpendicular to the horizon plane, etc. In another example, the rotational orientation may indicate when the device 100 is oriented in a "portrait" orientation. Similarly, the rotational orientation may indicate when the device 100 is oriented in a "landscape" orientation. The IMU 118, however, may be further configured to determine and/or output other and/or additional information indicating rotational orientation, such as tilt and/or one or more of six full degrees of freedom (6DoF) (e.g., pitch, roll, yaw, surge, heave, and/or sway).

To the accomplishment of the aforementioned measurements (e.g., angular rate, linear acceleration, orientation relative to magnetic north, etc.), the IMU 118 may include and/or may be communicatively coupled with a magnetometer 120, an accelerometer 122, and/or a gyroscope 124. In one example, the magnetometer 120 may comprise a Hall effect sensor (e.g., solid-state Hall effect sensor). In one example, the accelerometer 122 may comprise a microelectromechanical system (MEMS) accelerometer and/or tilt sensor. In one example, the gyroscope 124 may comprise a MEMS gyroscope.

The IMU 118 may output measurement information indicating one or more of the aforementioned measurements. The instructions of the application loaded into memory 128 may configure the CPU(s) 102 to collect the one or more aforementioned units using the IMU 118. Further, the instructions of the application loaded into memory 128 may configure the CPU(s) 102 to provide the measurement information to the application.

In various aspects, the device 100 may include a navigation unit 126. The navigation unit 126 may be configured to determine a geographic position of the device 100. In various aspects, the geographic position may comprise geographic coordinates. For example, the geographic coordinates may include latitudinal and/or longitudinal coordinates. The navigation unit 126 may include and/or may be communicatively coupled with a Global Navigation Satellite System (GNSS), such as a Global Positioning System (GPS), GLONASS, or other similar geographic positioning system. In some aspects, the navigation unit 126 may include and/or may be communicatively coupled with a regional navigation system and/or an augmentation system (e.g., satellite-based augmentation system (SBAS)).

In one aspect, the navigation unit 126 may be configured to determine a geographic position of the device 100 at least partially based on signals received from a network via the connectivity unit 108. For example, the navigation unit 126 may include or be communicatively coupled with an indoor positioning system (IPS). For example, the navigation unit 126 may use Bluetooth for IPS. In one aspect, the IPS may supplement geographic position information obtained through GPS and/or GNSS.

In one aspect, the navigation unit 126 may use a WiFi positioning system, e.g., for triangulation and/or trilateration of the geographic position of the device 100. In one aspect, the navigation unit 126 may be configured to measure received signal strength indicators (RSSIs) corresponding to signals received from one or more WiFi access points (APs). For example, the navigation unit 126 may obtain an RSSI corresponding to a signal received from a WiFi AP, and may use fingerprinting to estimate a geographic position of the device 100. In another example, the navigation unit 126 may receive signals from one or more WiFi APs and measure angle(s) of arrival (AoA) for AoA-based WiFi positioning. In another example, the navigation unit 126 may send message(s) to one or more WiFi APs, monitor for response(s) (e.g., acknowledgement message(s)) from the one or more WiFi APs, and estimate a time of flight (ToF) of the message(s)/response(s) for ToF-based WiFi positioning. In one aspect, the WiFi positioning system may supplement geographic position information obtained through the GPS and/or GNSS.

In various aspects, instructions loaded into memory 128 (e.g., instructions of an address detector) may configure at least the CPU(s) 102 to collect positional information indicating a position of a device 100, e.g., using one or more of the aforementioned components of the device 100 (e.g., the IMU 118, the navigation unit 126, etc.). The instructions of the application loaded into memory 128 may configure at least the CPU(s) 102 to determine a selected structure that is proximate to the position of the device 100 based on the positional information indicating the position of the device 100. The instructions of the application loaded into memory 128 may configure at least the CPU(s) 102 to identify selected address information corresponding to the selected structure, and the selected address information may indicate an alphanumeric identifier that is specific to the selected structure.

FIG. 2 is a diagram illustrating an environment 200 in which a computing device 202 in located. The computing device 202 may be the device 100 of FIG. 1. In various aspects, the device 202 may be operated by a user.

At least one structure 204 may be located in the environment 200. As illustrated, a plurality of other structures 205 may be also located in the environment. In one example, the structures 204, 205 may be houses or other structures/buildings conforming to a building code in an area that is zoned for residential construction. However, the structures 204, 205 may be essentially any other real property. In a further aspect, the structures 204, 205 may be absent, and the device 202 may be oriented toward a parcel suitable for integration or affixation of a structure (e.g., similar to the structures 204, 205).

In various aspects, the user of the device 202 may be interested in obtaining information about the structure 204. For example, the user of the device 202 may be interested in the obtaining the address of the structure 204 and, potentially, additional information about the structure 204 and/or the property on which the structure is affixed. Information about the address and/or additional information may not be readily available to the user and, therefore, a relatively quick and efficient approach to obtaining the address and/or additional information may be desirable.

In aspects, the device 202 may be relatively proximate to the structure 204. For example, the device 202 may be proximate to the structure 204 so that the structure 204 is within a field of view of the device 202. In one aspect, the device 202 may be within a suitable distance so that at least a portion of the structure 204 is within a field of view of a camera of the device 202 when the device 202 is oriented with the camera facing the structure 204.

In one aspect, the device 202 may be considered relatively proximate to the structure 204 when the device 202 is approximately within a threshold distance from the structure 204. In one aspect, the device 202 may be considered relatively proximate to the structures 204, 205 based on a boundary threshold surrounding the device 202, such as a circular boundary surrounding the device 202. In one example, the device 202 may be considered proximate to the structure 204 when the device is approximately 30 meters or less from the structure 204. However, the threshold may be approximately any distance at which the structure 204 is discernable (e.g., the building envelope of the structure 204 is detectable in an image captured by the camera that depicts at least a portion of the structure 204). In aspects, the relative proximity of the device 202 to structures 204, 205 may change as the device 202 moves throughout the environment 200 (e.g., when the user is walking with the device 202).

In various aspects, a user of the device 202 may be interested in obtaining an address 210 and/or other information about the structure 204. This address 210 and/or other information may not be readily available to the user. The device 202 may include an address detector that is configured to determine the address 210 of the structure 204, and inform the user of the determined address 210. An address detector may be implemented in hardware, software, or firmware. In some aspects, an address detector may include computer-executable instructions that may be loaded into memory (e.g., memory 128 of FIG. 1) and executed by a processor (e.g., at least the CPU(s) 102 of FIG. 1), which may cause the device 202 to perform various operations described herein.

In one aspect, the user of the device 202 may orient the device 202 so that the structure 204 is within a line of sight of a camera of the device 202. In such an orientation, the camera may detect image data 206 representing the structure 204, and the address detector may cause this image data 206 be presented on a display of the device 202.

The address detector may receive input from the user that indicates the structure 204 is selected and, therefore, the user is interested in the address 210 of the structure. In one aspect, the user may select an option through a user interface provided in association with the address detector. In another aspect, the user input may comprise orientation of the device 202 such that a line of sight associated with the camera of the device 202 intersects the structure 204, and the orientation of the device 202 to detect the image data 206 representing the structure 204 may indicate that the user is interested in the address 210 of the structure 204.

The address detector may collect positional information indicating a position of the device 202, e.g., including geographic coordinates, a rotational orientation, a compass orientation, and/or a linear acceleration. Based on the positional information, the address detector may determine the selected structure 204. For example, the address detector may locate the position of the device 202 on a map. Using the positional information, the address detector may determine the representation of the selected structure 204 on the map.

In aspects, the address detector may identify the address 210 corresponding to the selected structure 204. For example, the address detector may identify the address 210 corresponding to the selected structure 204 based on the representation of the selected structure 204 on the map. In one aspect, the identified address 210 may be an alphanumeric identifier that uniquely identifies the selected structure, e.g., within a selected region (e.g., the region represented by the map).

The address detector may configure the device 202 to provide the identified address 210 to the user. For example, the address detector may cause a display of the device 202 to present the identified address 210 to the user. Illustratively, the address detector may cause the display of the device 202 to present the address 210 of the selected structure 204: 555. Grand Ave., Los Angeles, Calif. 90013.

In the present disclosure, aspects may be described for determination (e.g., identification, estimation, and/or verification) of an address corresponding to a selected structure. For example, the aspects described with respect to FIG. 2 may describe an approach to determination of an address corresponding to the selected structure. Additional and/or complementary aspects described herein may further describe an approach to determination of an address corresponding to a selected structure. Various aspects described herein may be implemented on a computing device, such as the device 100 of FIG. 1.

Accordingly, FIGS. 3A, 3B, 4, and 5 may describe aspects for determination of an address corresponding to a structure that is located on a parcel. The parcel may be proximate to other parcels, and "proximate" may not necessarily imply "most proximate." Thus, FIGS. 3A, 3B, 4, and 5 may describe aspects of estimating and verifying an address associated with a structure, e.g., so that the structure and/or parcel may be uniquely distinguished from surrounding structures and/or parcels.

Figure 3A:
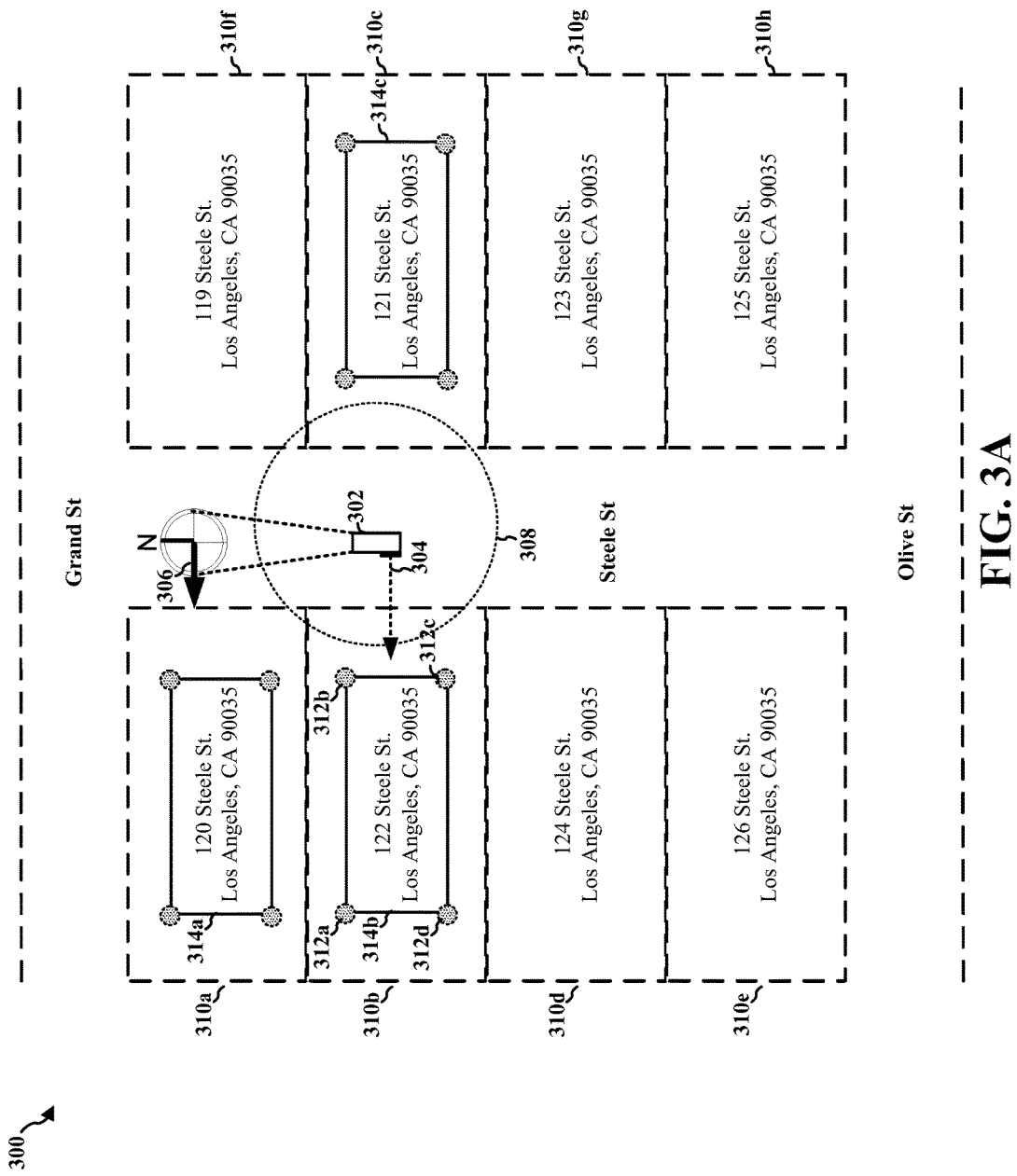
FIGS. 3A and 3B are block diagrams illustrating examples of environments in which a computing device may be positioned.
Figure 3B:
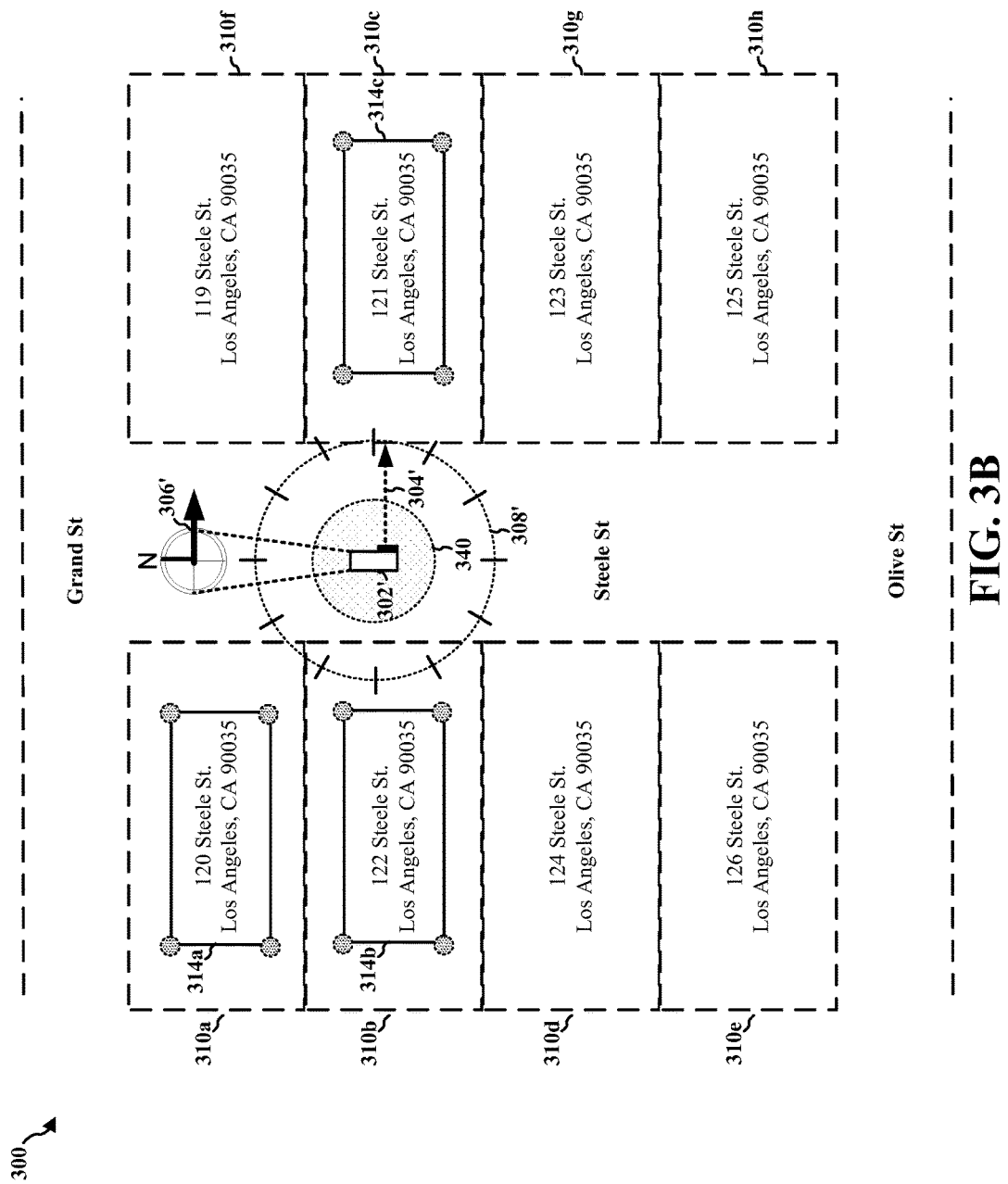

FIGS. 3A and 3B illustrates an environment 300 that includes a plurality of parcels 310*a-h*. Each parcel 310*a-h* may be an area of land (e.g., real property) that is defined by boundaries (e.g., a set of geographic coordinates). In some aspects, the parcels 310*a-h* do not overlap with one another; that is each parcel 310*a-h* is uniquely bounded. In some aspects, one of more of the parcels 310*a-h* includes a respective structure 314*a-c*. Examples of the structures 314*a-c* include homes, apartment buildings, or essentially any other structure (e.g., such as commercial buildings and so forth). Each parcel 310*a-h* and the respective one of the structures 314*a-c* located thereon may be real property.

Each parcel 310*a-h*, and/or a respective structure 314*a-c* located thereon, may be associated with a respective address, which may be an alphanumeric identifier that uniquely identifies the each parcel 310*a-h* in the environment 300. For example, the parcel 310*b* may be associated with the address 122 Steele St., Los Angeles, Calif. 90035.

A device 302/302' may be disposed in the environment 300. The device 302/302' may have an orientation 306/306' relative to magnetic north. As illustrated in FIG. 3A, the device 302 may have a first orientation 306 in an approximately western direction.

Figure 4:
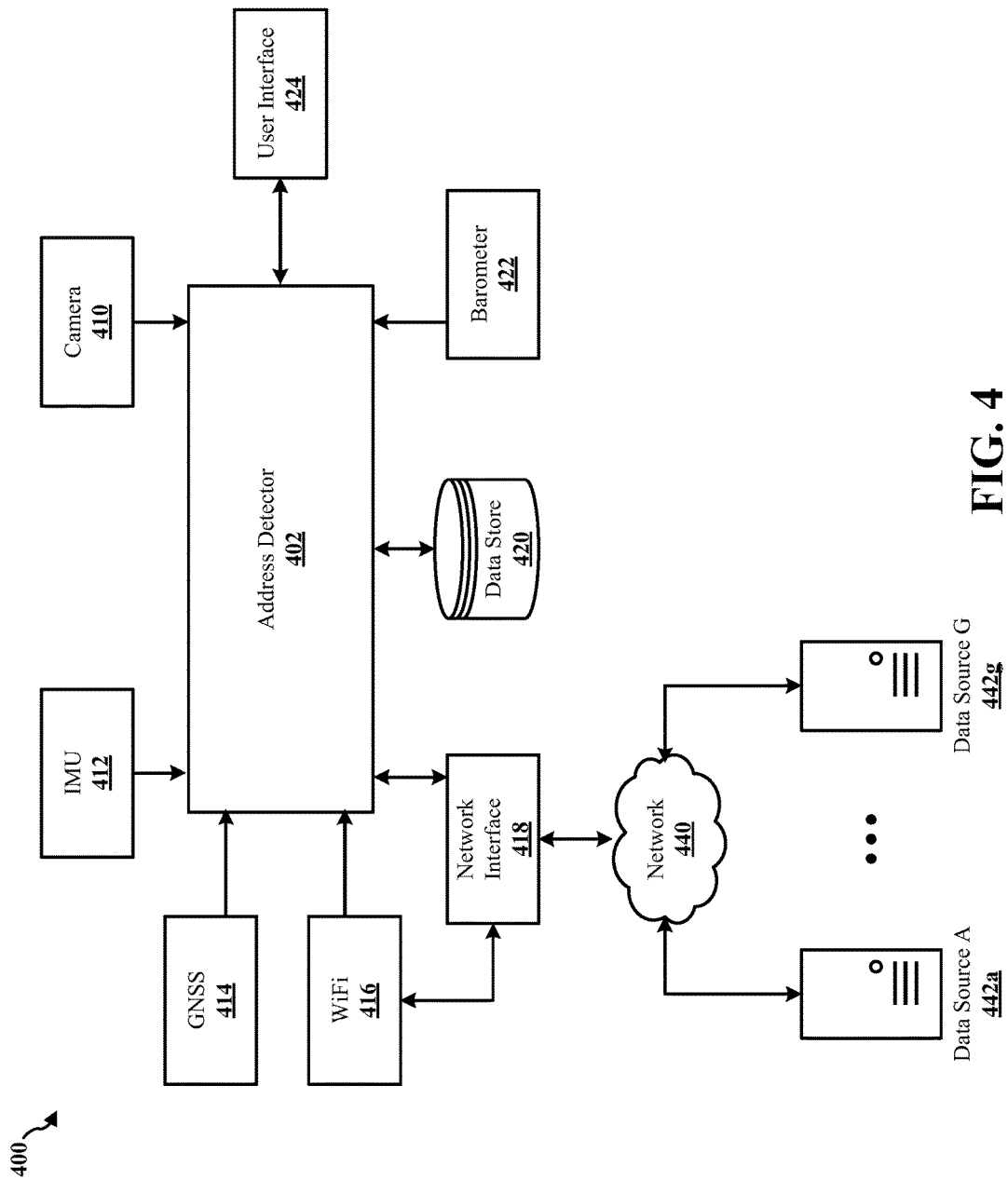
FIG. 4 is a block diagram illustrating an example of a computing device configured to communicate over a network.

With reference to FIG. 4, the device 302 may be configured with an address detector 402. The address detector 402 may be implemented in hardware, software, or firmware. In some aspects, the address detector 402 may include computer-executable instructions that may be loaded into memory and executed by a processor, which may cause the device 302 to perform various operations described herein.

The device 302 may further include and/or may be communicatively coupled with a camera 410, an IMU 412, a GNSS component 414, a WiFi component 416, a network interface 418, a data store 420 (e.g., local memory or cloud storage), a barometer 422, and/or a user interface 424. By way of illustration in the context of FIG. 1, the camera 410 may be the camera 116 (e.g., in communication with the imager 106), the IMU 412 may be the IMU 118, the WiFi component 416 and/or the network interface 418 may be integrated in the connectivity unit 108, the data store 420 may be at least partially implemented as the memory 128, and/or the user interface 424 may be the user interface 110.

In one aspect, the device 302 may collect positional information indicating a position of the device 302. For example, referring to FIG. 5, the device 302 may collect the positional information 510. In some aspects, the collection of the positional information may begin with a coarse acquisition of a coarse position of the device 302, and then a relative refinement of the coarse position.

For example, the address detector 402 may determine a position 308 of the device 302 by obtaining a set of geographic coordinates (e.g., a latitudinal value and a longitudinal value) from the GNSS component 414. In another example, the address detector 402 may obtain information indicating the position 308 of the device 302 based on signals received by the WiFi component 416 through the network interface 418 (e.g., the WiFi component 416 may be used for WiFi positioning).

In some aspects, the geographic coordinates from the GNSS component 414 and the information indicating the position 308 of the device 302 from the WiFi component 416 may be used in combination to determine the position 308 of the device 302. For example, WiFi positioning may be used to refine the coarse position of the device 302 so that the position 308 of the device 302 is more accurately captured relative to GNSS positioning.

Further to the collection of the positional information, the address detector 402 may obtain a rotational orientation of the device 302. For example, the rotational orientation of the device 302 may be obtained through the IMU 412 (e.g., a gyroscope and/or accelerometer). In some aspects, the rotational orientation may indicate whether the device 302 is oriented in a "portrait" mode or a "landscape" mode. In another example, the rotational orientation may indicate whether the device 302 is horizontally oriented (e.g., in which the line of sight 304 is perpendicular to the horizon) or vertically oriented (e.g., in which the line of sight 304 is parallel to the horizon). FIG. 3A illustrates an example in which the device 302 is rotationally oriented to be vertical and in a landscape mode.

Further to the collection of the positional information, the address detector 402 may obtain an orientation 306 of the device 302 relative to magnetic north. For example, the orientation 306 of the device 302 may be obtained from the IMU 412 (e.g., through a magnetometer). In some aspects, the orientation 306 of the device 302 relative to magnetic north may indicate a line of sight 304 of the device. The line of sight 304 may indicate a direction in which an image sensor of the camera 410 is oriented. In some aspects, the orientation 306 of the device 302 relative to magnetic north may include compass coordinates, a bearing of direction, etc.

The orientation 306 of the device relative to magnetic north may be relative to a leading edge of the device 302. The leading edge of the device 302 may be dependent upon the rotational orientation of the device 302. For example, when the device is in a "portrait" mode and vertically oriented, the leading edge may be the rear face of a housing the device 302. In another example, the leading edge may be a bevel of a top of a housing of the device 302 when the device 302 is horizontally oriented.

In other aspects, the address detector 402 may collect various other information that may be used to describe the position of the device 302.

In some aspects, the device 302 may communicate, over a network 440, with one or more data sources 442*a-b*. The data sources 442*a-g* may be one or more remote servers, one or more resources, or another remote system. The device 302 may obtain (e.g., request, receive, etc.) data from one or more of the data sources 442*a-g*. While the data sources 442*a-g* are illustrated as separate, one or more of the data sources may be a same data source (e.g., a same server, a same resource, etc.).

The address detector 402 may be configured to interface with one or more of the data sources 442*a-b*. For example, in the context of FIG. 5, the address detector 402 may be configured to package at least a portion of the positional information 510, collected by the address detector, for transmission over the network 440 via the network interface 418.

Figure 5:
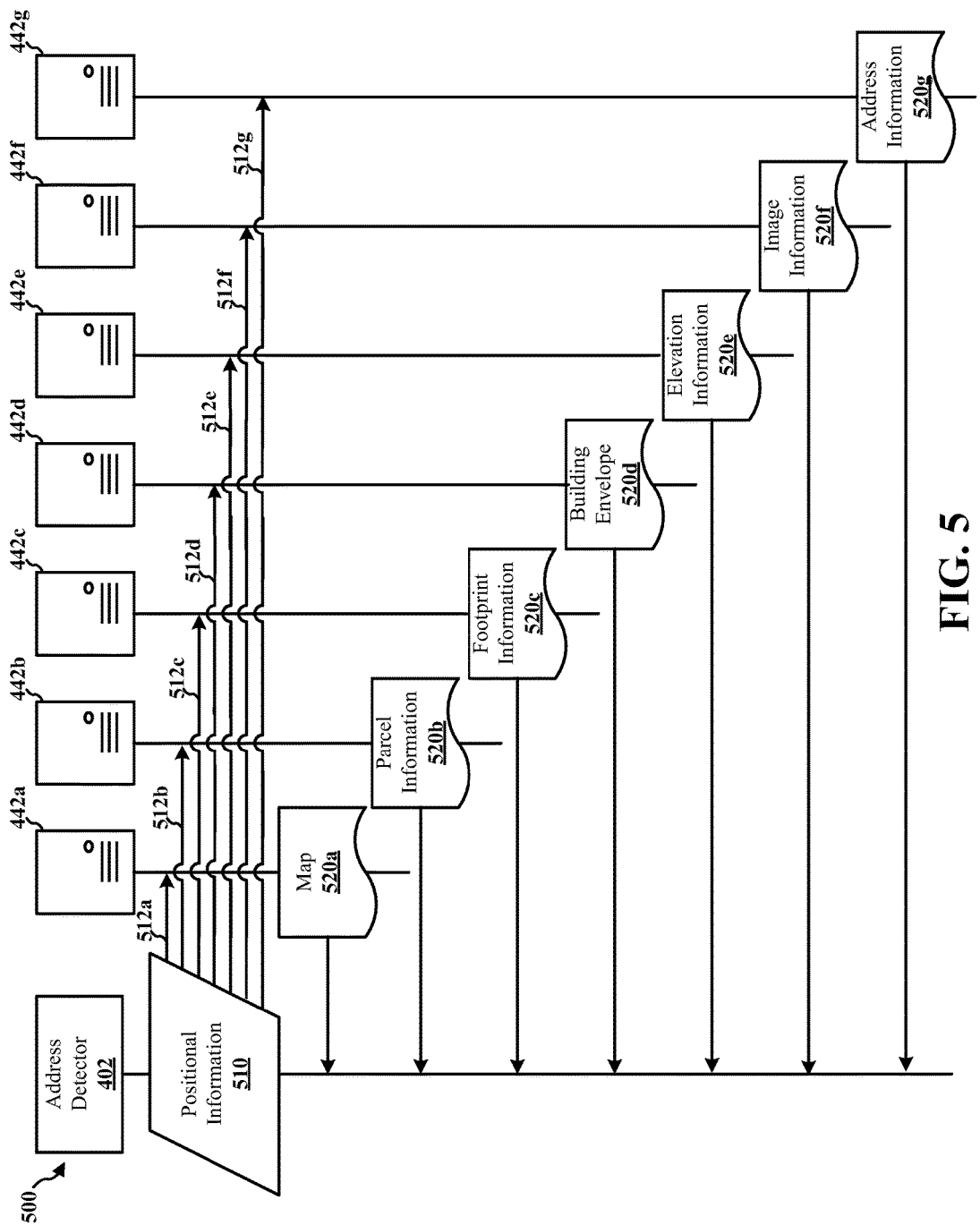
FIG. 5 is a call flow diagram illustrating an example of a wireless communications system.

Still in the context of FIGS. 4-5, the address detector 402 may generate one or more requests 512*a-g* for transmission over the network 440 via the network interface 418. Each of the requests 512*a-g* may indicate at least a portion of the positional information 510. In some aspects, at least two of the requests 512*a-g* may be a same request, such as when one or more of the data sources 442*a-g* are a same data source. In some aspects, one or more of the requests 512*a-g* may include at least a same portion of the positional information 510. For example, at least two of the requests 512*a-g* may include information indicating the position 308 (e.g., geographic coordinates obtained via the GNSS component 414 and/or other information indicating the position 308 obtained via the WiFi component 416).

The address detector 402 may cause transmission of one or more of the requests 512a-g over the network 440 via the network interface 418. Based on one or more of the requests 512a-g, the address detector 402 may receive regional information 520a-g over the network 440 from one or more of the data sources 442a-g.

According to one aspect, a first request 512a may indicate at least information indicating the position 308 of the device 302, which may include the geographic coordinates obtained via the GNSS component 414 and/or other information indicating the position 308 obtained via the WiFi component 416. In some aspects, the first request 512a may include further portions of the positional information 510. The first request 512a may be transmitted over the network 440 via the network interface 418 to a first data source 442a. Based on the first request 512a, the first data source 442a may provide a map 520a. Accordingly, the address detector 402 may obtain the map 520a over the network 440 via the network interface 418. The map 520a may be stored in a data structure in the data store 420.

In various aspects, the map 520a may include a geographic representation of at least a portion of the environment 300. For example, the map 520a may include a road map that indicates the roadways of Grand Street, Steele Street, and Olive Street. In addition, the map 520a may include information indicating each of the parcels 310a-h and/or respective addresses associated with each of the parcels 310a-h. In some aspects, the map 520a may indicate respective elevations associated with each of the parcels 310a-h (e.g., elevations may be indicated via contour lines). Further, the map 520a may indicate one or more elevations associated with one or more areas surrounding the parcels 310a-h (e.g., the map 520a may indicate elevations for the entire region depicted 520a).

According to one aspect, a second request 512b may indicate at least information indicating the position 308 of the device 302, which may include the geographic coordinates obtained via the GNSS component 414 and/or other information indicating the position 308 obtained via the WiFi component 416. In some aspects, the second request 512b may include additional portions of the positional information 510. The second request 512b may be transmitted over the network 440 via the network interface 418 to a second data source 442b. Based on the second request 512b, the second data source 442b may provide parcel information 520b. Accordingly, the address detector 402 may obtain the parcel information 520b over the network 440 via the network interface 418. The parcel information 520b may be stored in a data structure in the data store 420.

In various aspects, the parcel information 520b may include information associated with one or more of the parcels 310a-h that are proximate to the device 302 (e.g., proximate to the position 308). In one aspect, the parcel information 520b may include one or more sets of coordinates indicating geographic positions of the one or more parcels 310a-h, such as geographic coordinates that define the boundaries of one or more of the parcels 310a-h. For example, the parcel information 520b may include at least a set of coordinates that define the boundary of the second parcel 310b.

According to one aspect, a third request 512c may indicate at least information indicating the position 308 of the device 302, which may include the geographic coordinates obtained via the GNSS component 414 and/or other information indicating the position 308 obtained via the WiFi component 416. In some aspects, the third request 512c may include additional portions of the positional information 510. The third request 512c may be transmitted over the network 440 via the network interface 418 to a third data source 442c. Based on the third request 512c, the third data source 442c may provide structural footprint information 520c. Accordingly, the address detector 402 may obtain the structural footprint information 520c over the network 440 via the network interface 418. The structural footprint information 520c may be stored in a data structure in the data store 420.

In various aspects, the structural footprint information 520c may include information associated with one or more of the structures 314a-c that are proximate to the device 302 (e.g., proximate to the position 308). In one aspect, the structural footprint information 520c may include one or more sets of coordinates indicating geographic positions of one or more of the structures 314a-c, such as geographic coordinates that define the boundaries or perimeters of one or more of the structures 314a-c. For example, the structural footprint information 520c may include at least a set of coordinates that defines the boundary or perimeter of the second structure 314b. In one aspect, the structural footprint information 520c may indicate dimensions of one or more of the structures 314a-c, such as height, width, and/or depth.

According to one aspect, a fourth request 512d may indicate at least information indicating the position 308 of the device 302, which may include the geographic coordinates obtained via the GNSS component 414 and/or other information indicating the position 308 obtained via the WiFi component 416. In some aspects, the fourth request 512d may include additional portions of the positional information 510. The fourth request 512d may be transmitted over the network 440 via the network interface 418 to a fourth data source 442d. Based on the fourth request 512d, the fourth data source 442d may provide building envelope information 520d. Accordingly, the address detector 402 may obtain the building envelope information 520d over the network 440 via the network interface 418. The building envelope information 520d may be stored in a data structure in the data store 420.

In various aspects, the building envelope information 520d may include information associated with one or more of the structures 314a-c that are proximate to the device 302 (e.g., proximate to the position 308). In one aspect, the building envelope information 520d may include information describing the physical aspects of one or more of the structures 314a-c. For example, the building envelope information 520d may include at least information describing physical separators (e.g., walls, roofing, windows, foundation, doorways, openings, ceilings, etc.) of the second structure 314b. In one aspect, the building envelope information 520d may include one or more technical drawings representing the architectural design (e.g., blueprints) of one or more of the structures 314a-b.

According to one aspect, a fifth request 512e may indicate at least information indicating the position 308 of the device 302, which may include the geographic coordinates obtained via the GNSS component 414 and/or other information indicating the position 308 obtained via the WiFi component 416. In some aspects, the fifth request 512e may include additional portions of the positional information 510. The fifth request 512e may be transmitted over the network 440 via the network interface 418 to a fifth data source 442e. Based on the fifth request 512e, the fifth data source 442e may provide elevation information 520e. Accordingly, the address detector 402 may obtain the elevation information 520e over the network 440 via the network interface 418. The elevation information 520e may be stored in a data structure in the data store 420.

In various aspects, the elevation information 520e may include information indicating an elevation at which the device 302/302' is estimated to be located (e.g., based on the position 308/308' of the device 302/302'.

According to one aspect, a sixth request 512f may indicate at least information indicating the position 308 of the device 302, which may include the geographic coordinates obtained via the GNSS component 414 and/or other information indicating the position 308 obtained via the WiFi component 416. In some aspects, the sixth request 512f may include additional portions of the positional information 510. The sixth request 512f may be transmitted over the network 440 via the network interface 418 to a sixth data source 442f Based on the sixth request 512f, the sixth data source 442f may provide image information 520f Accordingly, the address detector 402 may obtain the image information 520f over the network 440 via the network interface 418. The image information 520f may be stored in a data structure in the data store 420. In various aspects, the image information 520f may include one or more images depicting one or more of the structures 314a-c that are proximate to the device 302 (e.g., proximate to the position 308).

According to one aspect, a seventh request 512g may indicate at least information indicating the position 308 of the device 302, which may include the geographic coordinates obtained via the GNSS component 414 and/or other information indicating the position 308 obtained via the WiFi component 416. In some aspects, the seventh request 512g may include additional portions of the positional information 510. The seventh request 512g may be transmitted over the network 440 via the network interface 418 to a seventh data source 442g. Based on the seventh request 512g, the seventh data source 442g may provide address information 520g. Accordingly, the address detector 402 may obtain the address information 520g over the network 440 via the network interface 418. The address information 520g may be stored in a data structure in the data store 420.

In various aspects, the address information 520g may include information indicating one or more addresses of one or more of the parcels 310a-h and/or one or more of the structures 314a-c that are proximate to the device 302 (e.g., proximate to the position 308). For example, the address information 520g may indicate that the addresses of 119 Steele St., Los Angeles, Calif. 90035, 120 Steele St., Los Angeles, Calif. 90035, 121 Steele St., Los Angeles, Calif. 90035, and so forth.

The address detector 402 may identify an address corresponding to a selected structure. In one aspect, the address detector 402 may identify the address corresponding to the selected structure based on the regional information 520a-g. Illustratively, when the address detector 402 determines that the second structure 314b is the selected structure, the address detector 402 may identify the address of 122 Steele St., Los Angeles, Calif. 90035.

In order to determine an address, the address detector 402 may be configured to determine a selected structure that is proximate to the position of the device 302. A selected structure may be a structure (e.g., the second structure 314b) located on a parcel (e.g., the second parcel 310b) that is to be identified. For example, the address detector 402 may identify address information that corresponds with the selected structure, and the address information may include at least an address (e.g., an alphanumeric identifier that is specific to the selected structure and uniquely distinguishes the selected structure from other structures that are proximate to the selected structure).

The address detector 402 may determine the selected structure based on at least a portion of the collected positional information of the device 302. For example, the position 308 and the line of sight 304 may indicate that the second structure 314b is a selected structure.

The device 302 may be oriented so that the camera 410 may capture image data (e.g., a still frame) of at least a portion of the second structure 314b that is located on the second parcel 310b. In one example, the second structure 314b may be designated as a selected structure based on the image data. The second structure 314b may be designated as a selected structure based on the position of the at least the portion of the second structure 314b in the captured image data. For example, the at least the portion of the second structure 314b may be positioned relative to a center of the image data and/or the at least the portion of the second structure 314b may occupy a majority of the image data, which may indicate that the second structure 314b is selected.

In another aspect, the device 302 may receive input through the user interface 424 that indicates that the second structure 314b is selected. For example, the image data may be presented on a display of the device 302, and the address detector 402 may receive user input through the user interface 424 indicating selection of the second structure 314b (e.g., the user interface 424 may detect tactile input on a portion of the image data presented on the display and the tactile input may correspond with the second structure 314b, the second structure 314b may be within the line of sight 304 for a predetermined time period, etc.).

In one aspect, the second structure 314b may be selected when the second structure 314b is a focal point of the line of sight 304. For example, the second structure 314b may be selected when a focal point of the line of sight 304 intersects the second structure 314b (e.g., when image data captured by the camera 410 captures the second structure 314b approximately at a center of the image data).

In another example, the address detector 402 may determine the line of sight 304, which may be orthogonal to a lens of the camera 410. The address detector 402 may determine the line of sight 304, for example, based on the rotational orientation and/or the orientation relative to magnetic north. For example, the rotational orientation may indicate that the device 302 is oriented approximately perpendicular to the horizon (e.g., the device 302 is approximately vertical), so that the line of sight 304 is approximately parallel to the horizon (and therefore intersects the second structure 314b). In addition, the orientation of the device 302 relative to magnetic north may indicate that the device 302 is orientated approximately toward the west, and the second structure 314b may be relatively to the west of the device 302.

The address detector 402 may first estimate the address corresponding to selected structure. For example, the address detector 402 may first estimate the address corresponding to the second structure 314b. The address detector 402 may perform the estimation at least partially based on the position 308, the line of sight 304, the orientation 306, and/or rotational orientation of the device 302. For example, the address detector 402 may determine the position 308 is proximate to the second structure 314b. In addition, the address detector 402 may determine that the rotational orientation of the device 302 is approximately perpendicular to the horizon (e.g., the device 302 is approximately vertical and therefore the line of sight 304 is approximately parallel to the horizon) and, therefore, the device 302 is likely to be positioned outside of the structure. In addition, the address detector 402 may determine that the line of sight 304 is approximately directed toward the second structure 314*b* (e.g., the camera 410 may capture image data that depicts at least a portion of the second structure 314*b*) and, therefore, the address detector 402 may identify the second structure 314*b* is within the line of sight 304. In addition, the address detector 402 may use the position 308 of the device 302 (e.g., latitude and longitude) in order to estimate the first address, such as by identifying (e.g., estimating) the geographic coordinates that are approximately within the line of sight 304 (e.g., toward the second structure 314*b* when the device 302 is approximately perpendicular to the horizon).

The address detector 402 may correlate the line of sight 304 and the orientation 306 with the second structure 314*b*. In one aspect, the address detector 402 may identify the location of the device 302 on a map (e.g., the map 520*a* obtained from the first data source 442*a* or another map that may be retrieved from the data store 420) using the position 308—e.g., the address detector 402 may correlate the position 308 (e.g., geographic coordinates) with a position on the map. Accordingly, the address detector 402 may determine that the device 302 is proximate to the parcels 310*a-h*. Further, the address detector 402 may determine that the structures 314*b*, 314*c* are relatively proximate to the device 302 because the structures 314*b*, 314*c* are respectively located on the parcels 310*b*, 310*c*.

Further, the address detector 402 may determine that the device 302 is positioned so that the second structure 314*b* is located in front of the device 302—e.g., the address detector 402 may reference the map to determine a structure indicated on the map that is relatively west of the device 302 because the orientation 306 of the device is approximately western. In addition, the address detector 402 may determine that the line of sight 304 indicates that the device 302 is rotationally orientated toward the second structure 314*b* (as opposed to rotationally oriented horizontally, e.g., such that the line of sight 304 would be approximately perpendicular to the horizon).

Based on the line of sight 304, the orientation 306, and/or the position 308 as represented on the map, the address detector 402 may estimate the address of the second structure 314*b*, which may be the selected structure. In particular, once the address detector 402 determines that the selected structure is the second structure 314*b*, then the address detector 402 may identify the address corresponding to the second structure 314*b*. For example, the address detector 402 may identify the location of the second structure 314*b* on the map (e.g., the map 520*a*), and identify the address corresponding to the location of the second structure 314*b* on the map. In another example, the address detector 402 may identify the address corresponding to the location of the second structure 314*b* based on the address information 520*g*, which may indicate geographic coordinates corresponding to the address. In another example, the address detector 402 may identify the address corresponding to the second structure 314*b* based on a plurality of information obtained from the one or more data sources 442*a-g* (e.g., based on the map 520*a* and based on the address information 520*g*).

In one aspect, the address may be indicated by the address information 520*g*. For example, the address information 520*g* may indicate addresses according to geographic locations (e.g., geographic coordinates). The address detector 402 may correlate the location of the second structure 314*b* on the map with the address information 520*g* that indicates an address for that corresponding location on the map.

The address detector 402 may then verify the first estimation of the address corresponding to the second structure 314*b*, as the selected structure. For example, the address detector 402 may determine a correlation between at least a portion of the positional information 510 and at least a portion of the regional information 520*a-g* that corresponds to the selected address information.

In one aspect, the address detector 402 may plot (e.g., determine and/or estimate) the parcel line corresponding to the second parcel 310*b* and/or one or more coordinates 312*a-d* corresponding to the envelope or footprint of the second structure 314*b*. The address detector 402 may plot the parcel line based on at least a portion of the positional information 510. For example, image data captured by the camera 410 may be combined with the orientation 306 of the device 302, rotational orientation of the device 302, and/or instantaneous acceleration of the device 302 obtained via the IMU 412 in order to identify one or more points corresponding to the second parcel 310*b* and/or the structure 314*b*.

The address detector 402 may use the position 308 of the device 302 in combination with the plotted parcel line. In some aspects, the address detector 402 may plot coordinates that are within a field of view of the camera 410, and therefore may be depicted in image data (e.g., the address detector may plot the coordinates 312*b-c* that are within the field of view of the camera 410).

The address detector 402 may determine whether a structure (e.g., a selected structure) is positioned as expected. For example, image data captured by the camera 410 may be combined within the plotted parcel line to determine whether a structure is positioned as indicated in the envelope or footprint of the second structure 314*b*. In one example, the address detector 402 may determine that the image data indicates that a structure is located at least partially on the plotted parcel line, and therefore, the address detector 402 may determine that the verification has at least partially failed because the plotted parcel line intersects a structure (e.g., when a structure should not intersect the parcel line). In another example, the address detector 402 may determine that the image data indicates that a structure is absent within the plotted parcel line, and therefore, the address detector 402 may determine that the verification has at least partially failed because the plotted parcel line is estimated to include a structure (e.g., when a structure should not intersect the parcel line).

When the address detector 402 determines that the selected structure is within the plotted parcel line (e.g., within a margin of error), then the address detector 402 may at least partially verify that the estimated address corresponds with the actual address for the second structure 314*b*. That is, the address detector 402 may at least partially verify the estimated address of the selected structure because the selected structure is at least partially within the plotted parcel line (and no structure lies on the plotted parcel line). Therefore, the address estimated for the selected structure may be at least partially verified as the address of the second structure 314*b*.

As an additional or alternative technique to verifying the first estimation of the address, the address detector 402 may compare image data captured by the camera 410 with image information 520*f* obtained from the data source 442*f*. Accordingly, the address detector 402 may compare image data captured by the camera 410 with image information 520*f* that depicts a structure that is located at the first estimated address. For example, the address detector 402 may identify one or more points corresponding to the selected second structure 314*b* in the image data captured by the camera 410. When the address detector 402 estimates the first estimated address to be 122 Steele St., Los Angeles, Calif. 90035, then the address detector 402 may identify one or more points corresponding to the second structure 314*b* in the image information 520*f* obtained from the data source 442*g*.

To compare the image data captured by the camera 410 with the image information 520*f*, the address detector 402 may perform key point matching. With key point matching, the address detector 402 may determine if the selected second structure 314*b* in the image data captured by the camera 410 corresponds with the second structure 314*b* in the image information 520*f*. In another example, the address detector 402 may perform feature extraction to identify one or more features corresponding with the selected second structure 314*b* in the image data captured by the camera 410, and the address detector may compare the extracted features with features corresponding to the second structure 314*b* in the image information 520*f*.

If the selected second structure 314*b* in the image data captured by the camera 410 corresponds with the second structure 314*b* in the image information 520*f*, then the address detector 402 may verify that the first estimation of the address of the selected structure is accurately estimated to be the address of the second structure 314*b*. In one aspect, the address detector 402 may determine whether a threshold number of key points and/or features match between the image data captured by the camera 410 and the second structure 314*b* in the image information 520*f* In another aspect, the address detector 402 may determine whether one or more of the key points and/or features between the image data captured by the camera 410 and the second structure 314*b* in the image information 520*f* match within a threshold margin of error. If the address detector 402 determines that the threshold number and/or the threshold margin of error is satisfied, then the address detector 402 may at least partially verify that the address first estimated for the selected structure is accurately estimated as the address for the second structure 314*b*.

As an additional or alternative technique to verifying the first estimation of the address, the address detector 402 may compare a measured elevation with the elevation information 520*e* obtained from the data source 442*e*, which may indicate an elevation proximate to the first estimated address. For example, the barometer 422 may measure the elevation of the device 302 when the device 302 is proximate to the second parcel 310*b* and/or the second structure 314*b*. The address detector 402 may obtain the measured elevation from the barometer 422 and may compare the measured elevation with elevation information 520*e* that indicates the elevation at which the device 302 is estimated to be positioned (e.g., elevation at a latitude/longitude estimated for the device 302). The address detector 402 may determine whether the measured elevation from the barometer 422 matches the elevation information 520*e* within a threshold margin. If the address detector 402 determines that the threshold margin is satisfied, then the address detector 402 may at least partially verify that the address first estimated for the selected structure is accurately estimated as the address for the second structure 314*b*.

The address detector 402 may perform additional and/or alternative operations in order to verify the first estimation of the address. For example, the address detector 402 may use augmented reality (AR) in order to verify the first estimation of the address, as described with respect to FIGS. 6A, 6B, and 7, infra.

If one or more of the aforementioned techniques for verifying the first estimation of the address fails (e.g., one or more of the aforementioned thresholds fails to be satisfied), then the address detector 402 may determine that the first estimation of the address is inaccurate. When the address detector 402 determines that the first estimation of the address is inaccurate, then the address detector may estimate a second address for the selected structure, and may repeat one or more of the aforementioned techniques for verifying the estimation of the address based on the regional information 520*a*-*g* and/or the address detector 402 may repeat one or more of the requests 512*a*-*g* in order to obtain new regional information with which to compare the plotted coordinates, the image data obtained through the camera 410, and/or the elevation measured by the barometer 422.

In various aspects, one or more of the aforementioned techniques for verifying the first estimation of the address may be differently weighted. For example, the comparison of the image data captured by the camera 410 with the second structure 314*b* in the image information 520*f* may be differently weighted than the comparison of the measured elevation with the elevation information 520*e* obtained from the data source 442*e*. Therefore, the first estimation of the address may be verified even if one or more of the aforementioned techniques fails (e.g., when a relatively lesser weighted technique fails but a relatively greater weighted technique verifies the first estimation).

By way of example, the address detector 402 may be positioned between the first parcel 310*a* and the second parcel 310*b*. The address detector 402 may determine that the selected structure is the second structure 314*b*, e.g., based on a line of sight, an orientation relative to magnetic north, and/or a geographic position. However, the address detector 402 may first estimate the selected address to correspond to the first parcel 310*a* and/or first structure 314*a*. For example, the address detector 402 may compare collected positional information and/or estimated plotted coordinates with regional information obtained from the data sources 442*a*-*g* that corresponds with the first parcel 310*a* and/or the first structure 314*a*. After first estimating the selected address, the address detector 402 may plot estimated coordinates of a parcel line corresponding to the second parcel 310*b* and/or plot estimated coordinates of the footprint and/or envelope corresponding to the second structure 314*b*. When the address detector 402 compares plotted coordinates estimated for the parcel line corresponding to the second parcel 310*b* with coordinates corresponding to the first parcel 310*a* (e.g., as indicated in parcel information obtained from a data source 442*b*), then the verification of the estimated address may fail because the threshold margin of error will be unsatisfied.

In various aspects, the address detector 402 may adjust or update collected positional information when the verification of the first estimation of the address fails. For example, the address detector 402 may reacquire the position 308 from the GNSS component 414 and/or the WiFi component 416. Additionally or alternatively, the address detector 402 may adjust and/or reacquire the line of sight 304 that is orthogonal to a lens of the camera 410. Additionally or alternatively, the address detector 402 may re-plot coordinates estimated for a parcel line and/or for a footprint or envelope. In effect, the address detector 402 may reevaluate the estimation of the address so that an address corresponding to the selected structure may be accurately identified.

With reference to FIG. 3B, the address detector 402 may be configured to refine the position 308 of the device 302/302'. For example, based on the regional information 520a-g and/or one or more of the aforementioned techniques for verifying the first estimation of the address, the address detector 402 may refine the position 308 of the device 302/302'. The refined position 340 of the device 302/302' may be more accurate than the position 308—e.g., the margin of error of the refined position 340 may be less than the position 308. For example, the refined position 340 may be indicated by a set of geographic coordinates that is closer to the physical position of the device 302/302' and/or the refined position 340 may include a higher degree of precision than the position 308 (e.g., latitudinal and/or longitudinal coordinates may include minutes and/or seconds).

In some aspects, the address detector 402 may generate one or more second requests (e.g., similar to the requests 512a-g) for transmission to the one or more data sources 442a-g. However, the one or more second requests may be based on various operations performed by the address detector 402 to identify and/or verify the address corresponding to the second parcel 310b and/or the second structure 314b. For example, the address detector 402 may generate the one or more requests based on the coordinates estimated for a parcel line and/or for a footprint or envelope and/or based on the line of sight 304/304'.

The address detector 402 may cause transmission, through the network interface 418, of the one or more second requests over the network 440 to the one or more data sources 442a-g. Based on the one or more second requests, the one or more data sources 442a-g may return regional information (e.g., similar to the regional information 520a-g). In one aspect, the regional information obtained based on the one or more second requests may describe the environment 300 surrounding than device 302/302' more accurately than if the requests only indicated the position 308. In another aspect, the address detector 402 may use the regional information obtained based on the one or more second requests to identify the refined position 340.

The address detector 402 may identify the refined position 340 of the device 302/302' according to one or more other approaches. For example, the address detector 402 may identify the refined position 340 based on WiFi positioning using the WiFi component 416 and/or the address detector 402 may reacquire geographic coordinates using the GNSS component 314.

With the refined position 340, the address detector 402 may more accurately identify an address that corresponds to a selected structure. For example, the address detector 402 may more accurately plot coordinates estimated for a parcel line and/or footprint or envelope, e.g., because the estimated distance between the device 302/302' and a section (e.g., corner) of the parcel and/or structure may be more accurate than if the position 308 is used.

With reference to the context between FIGS. 3A and 3B, the device 302/302' may change orientation 306/306' in the environment 300. For example, a user of the device 302/302' may turn around, such as when the user desires to identify an address corresponding to a different structure. Accordingly, the address detector 402 may be configured to determine a different selected structure, and identify the address for that different selected structure.

As illustrated in FIG. 3B, the device 302' may have an orientation 306' toward an approximately eastern direction. The address detector 402 may be configured to determine a selected structure, different than the second structure 314b that may have been first selected. For example, the address detector 402 may receive input from the user through the user interface 424 that indicates a new structure is to be selected.

The device 302' may have an orientation 306' so that the third structure 314c is at least partially within the line of sight 304'. Based on the position 308 (and/or refined position 340), the line of sight 304', the orientation 306', and/or the rotational orientation, the address detector 402 may determine that the third structure 314c is a selected structure. For example, when the third structure 314c is at least partially within the line of sight 304', the address detector 402 may cause the user interface 424 to present image data depicting at least a portion of the third structure 314c. Further, the address detector 402 may receive, through the user interface 424, an indication that third structure 314c is selected.

As described, supra, the address detector 402 may first estimate an address corresponding to the selected third structure 314c. For example, the address detector 402 may first estimate the address corresponding to the third structure 314c to be 121 Steele St., Los Angeles, Calif. 90035. The address detector 402 may estimate the address corresponding to the selected third structure 314c based on the position 308 (and/or refined position 340), the line of sight 304', and/or the orientation 306'. The address detector 402 may first estimate the address corresponding to the selected third structure 314c based on regional information, such as the regional information 520a-g.

The device 302' may store (e.g., cache) at least a portion of the regional information 520a-g in the data store 420, e.g., received from the one or more data sources 442a-b in response to the one or more requests 512a-g. In addition to information associated with the second parcel 310b and/or second structure 314b, the regional information 520a-g may include information associated with the third parcel 310c and/or third structure 314c. For example, the regional information 520a-g may indicate one or more of parcel information associated with the third parcel 310c, structural footprint information associated with the third structure 314c, building envelope information associated with the third structure 314c, a map that indicates a location of the third parcel 310c and/or third structure 314c, image information that depicts at least a portion of the third structure 314c, elevation information (e.g., an elevation at which the device 302' is estimated to be positioned), and/or address information associated with the third parcel 310c and/or the third structure 314c.

Because the device 302' stored at least a portion of the regional information 520a-g when identifying the address corresponding to the second structure 314b, the device 302' may access the stored regional information 520a-g in order to first estimate and/or verify the address corresponding to the selected third structure 314c. By accessing the data store 420 (which may be local to the device 302'), the address detector 402 may reduce overhead (e.g., time, over-the-air signaling, etc.) that may otherwise be incurred by sending another set of one or more requests to the one or more data sources 442a-g to obtain regional information.

Accordingly, the address detector 402 may provide a relatively quick and efficient way to identify addresses for a plurality of parcels and/or structures in an area that is relatively proximate to the device 302'. Further, because the regional information 520a-g may include information associated with a plurality of parcels and/or structures, the address detector 402 may be configured to identify addresses corresponding to parcels and/or structures that are in the 360° field of view of the device 302'. That is, the address detector 402 may select new structures as the device 302' changes orientations in the environment 300, and the address detector 402 may quickly identify addresses as each of the new structures is selected based on the regional information 520a-g that is stored in the data store 420.

However, in other aspects, the address detector 402 may generate and transmit one or more requests (e.g., similar to the requests 512a-g) to the one or more data sources 442a-g after initially obtaining the regional information 520a-g. For example, a portion of the regional information 520a-g may be absent with respect to a newly selected structure, and so the address detector 402 may request the absent portion of the regional information 520a-g. Illustratively, the information associated with the address corresponding to the third structure 314c may be absent from the address information 520g and, accordingly, the address detector 402 may request address information associated with the third structure 314c from the seventh data source 442g after obtaining the address information 520g.

In another aspect, the address detector 402 may generate one or more new requests for transmission to the one or more data sources 442a-g after verifying the first estimation of the address and/or after identifying the refined position 340. For example, by refining the positional information collected by the address detector 402 so that the position of the device 302' is more accurately represented in the positional information, the address detector 402 may obtain new regional information that is relatively more accurate and/or complete than the regional information 520a-g first obtained by the address detector 402. In having more accurate regional information, the address detector 402 may more accurately identify addresses corresponding to structures, which may reduce the frequency with which the address detector 402 misidentifies an address.

Figure 6A:
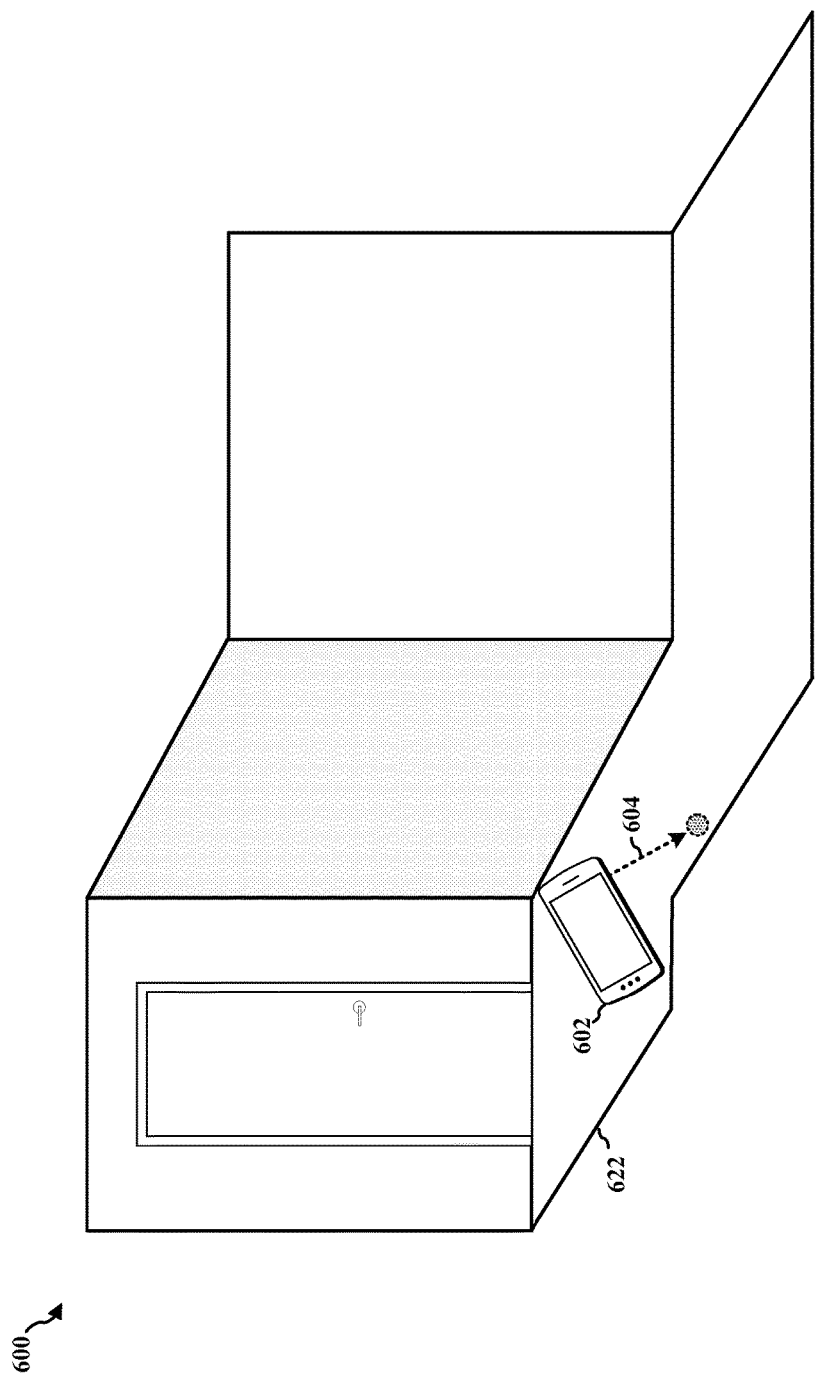
FIGS. 6A and 6B are block diagrams illustrating an example of an environment in which a computing device may be positioned.
Figure 6B:
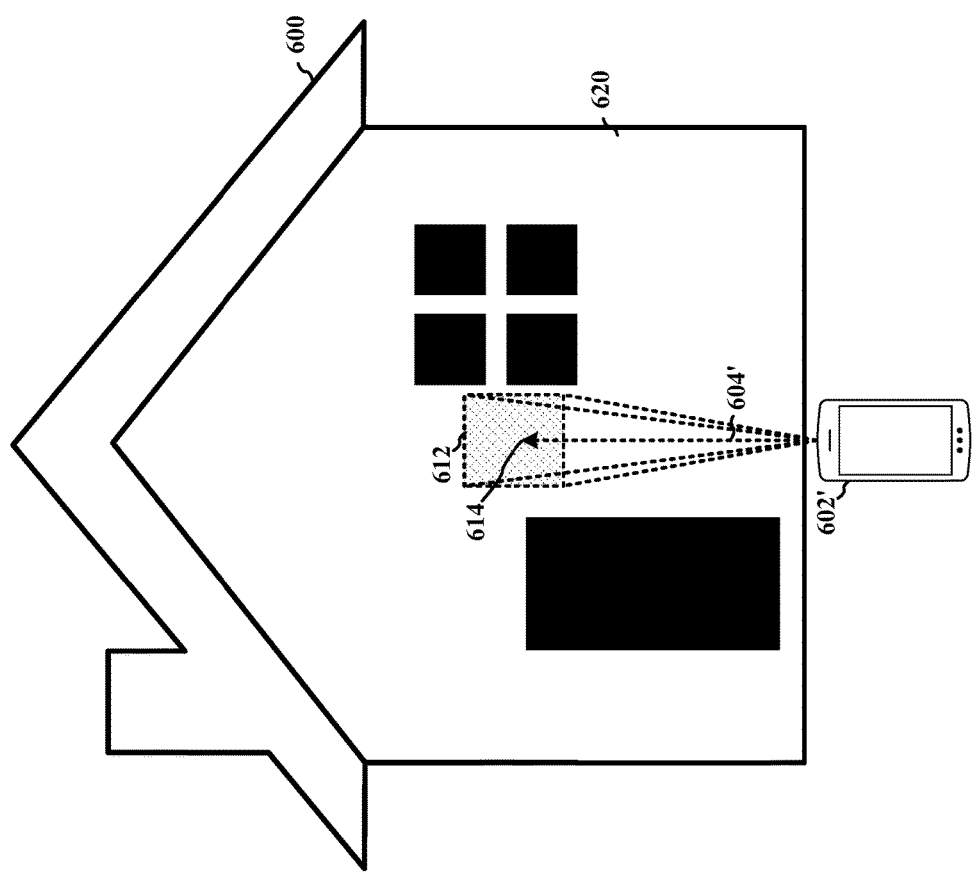
Figure 7:
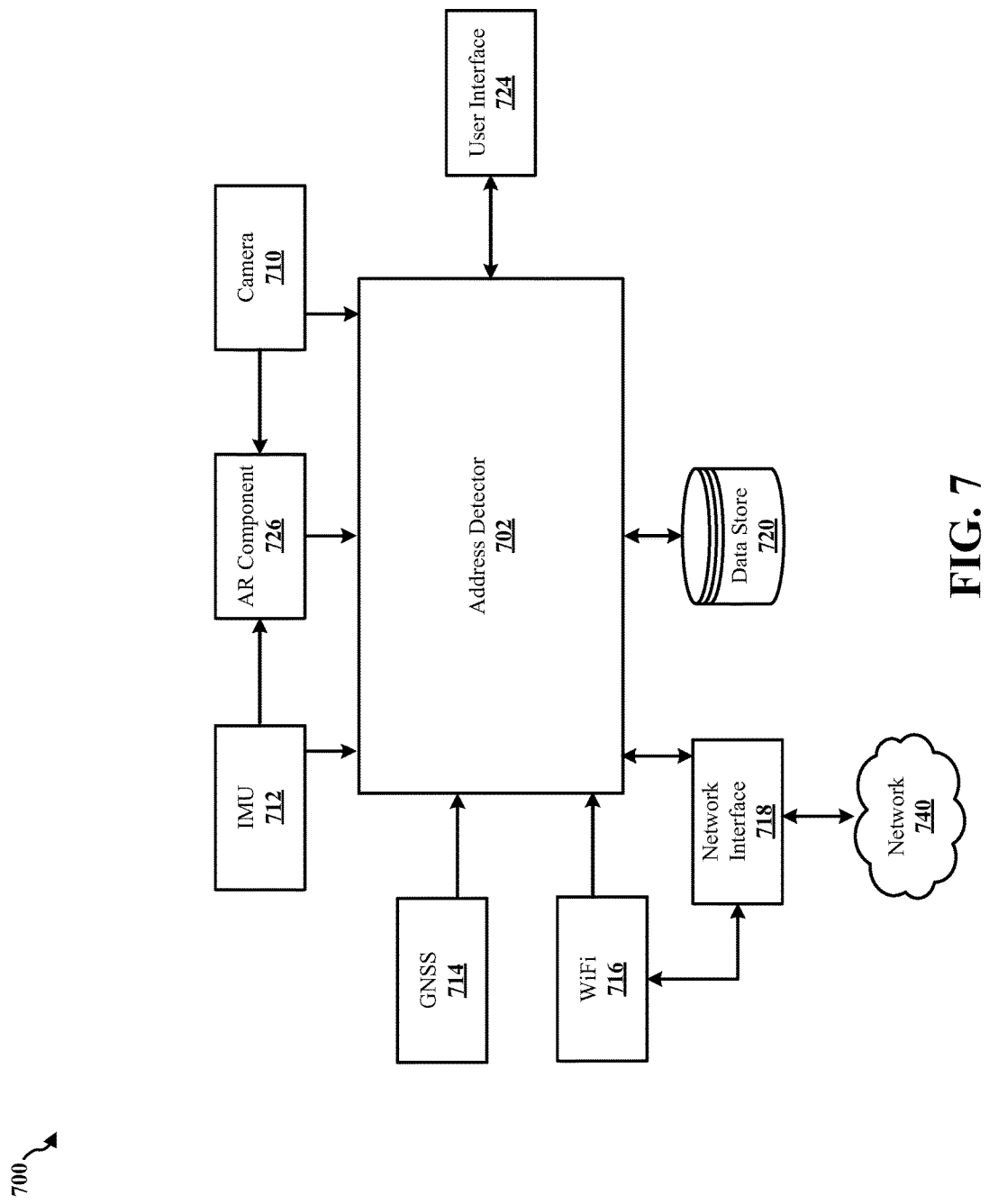
FIG. 7 is a block diagram illustrating an example of a computing device configured to communicate over a network.

FIGS. 6A, 6B, and 7 illustrate various aspects of determining a position of a device. For example, the determining a position of a device may provide an aspect of determining and/or verifying an address of a structure in which a device is located. Various techniques described with respect to FIGS. 6A, 6B, and 7 may be based on a line of sight, a rotational orientation of the device, and/or AR.

In the context of FIGS. 6A, 6B, and 7, a device 602/602' may be located within a structure 600 (e.g., FIG. 6A) or outside of a structure 600 (e.g., FIG. 6B). For example, referring to FIGS. 3A, 3B, 4, and 5, the device 602/602' may be an aspect of the device 302, and the device 602/602' may be positioned within the second structure 314b that is located on the second parcel 310b or outside the second structure 314b that is located on the second parcel 310b. In various aspects, the device 602/602' may include a data store 720. The data store 720 may include one or more data structures that include regional information 520a-g that is obtained from one or more data sources 442a-g.

Returning to FIGS. 6A, 6B, and 7, the device 602/602' may be differently oriented. For example, the device 602 may be rotationally oriented so that the device is approximately parallel to the horizon (e.g., rotationally oriented to be approximately horizontal so that the device 602 is relatively more parallel to the horizon than perpendicular to the horizon). The device 602 may be associated with a line of sight 604, which may be a line that is orthogonal to a lens of the camera 710 of the device 602. Because the device 602 is rotationally oriented so that the device 602 is relatively more horizontal than vertical, the line of sight 604 may intersect the ground rather than extend toward the horizon. Therefore, the line of sight 604 may intersect the floor 622 of the structure 600, instead of intersecting a wall of the structure 600.

Because the device 602 is rotationally oriented so that the line of sight 604 intersects the floor 622, the assumption may be that the device 602 is within the structure 600 rather than outside of the structure (e.g., as illustrated in FIG. 3A) or immediately proximate to the structure 600 (e.g., on a porch or awning of the structure 600, within a relatively short distance from the structure 600, such as ten feet, and so forth). In another aspect, when the geographic coordinates indicate that the device 602 is within a structure or immediately proximate to a structure (e.g., on a porch or awning, within a relatively short distance such as ten or twenty feet, etc.), then the assumption may be that the device 602 is within the structure 600 or immediately proximate to the structure 600. When the device 602 is within the structure 600 or most proximate to the structure 600, the address detector 702 may determine that the structure 600 is selected.

In aspects, the address detector 702 may determine that the device 602 is within a structure 600 based on the line of sight 604 and/or based on one or more measurements obtained from the IMU 712. For example, the address detector 702 may determine that the device 602 is within the structure 600 when the address detector 702 obtains a measurement from the IMU 712 (e.g., a gyroscope or accelerometer measurement) indicating that the device 602 is oriented to be relatively more parallel to the horizon than perpendicular to the horizon. In other words, the rotational orientation of the device 602 may be relatively more horizontal than vertical. Consequently, the line of sight 604 may intersect the floor 622 of the structure 600 rather than intersecting a wall 620 of the structure 600.

Because the device 602 is rotationally oriented to be approximately more horizontal, the address detector 702 may first estimate the position of the device based on geographic coordinates obtained from the GNSS component 714 and/or based on signals obtained from the WiFi component 716. In one aspect, the address detector 702 may obtain a WiFi signature or fingerprint associated with the network 740 through the network interface 718. The signature or fingerprint may be used for WiFi positioning, and the address detector 702 may obtain the position of the device 602 based on the WiFi signature or fingerprint.

The address detector 702 may first estimate the address, e.g., based on regional information (e.g., address information 520g) that corresponds to the position of the device 602 within the structure. In one aspect, the regional information may be stored in the data store 720. For example, the regional information may be cached in memory after the address detector 702 obtained regional information from one or more data sources (e.g., the address detector 702 may obtain the regional information when the device 602 is positioned outside of the home, as illustrated in FIG. 3A). In another aspect, the address detector may send one or more requests to one or more data sources in order to obtain regional information.

Because the address detector 702 may determine that the device 602 is positioned within a selected structure 600, the address detector 702 may determine that the first estimation of the address is accurate. However, the address detector 702 may still verify the first estimation of the address.

In one aspect, the address detector 702 may at least partially verify the first estimation of the address based on the position (e.g., geographic coordinates, such as latitude and longitude) of the device 602. For example, when the device 602 is oriented approximately parallel to the horizon (e.g., so that the line of sight 604 is oriented approximately into the floor or ground), then the address detector 702 may compare the position (e.g., geographic coordinates obtained from the GNSS component 714) with the regional information (e.g., parcel information 520b, footprint information 520c, building envelope information 520d, etc.) for the envelope associated with the selected structure 600 and/or the parcel line associated with the selected structure 600.

If the address detector 702 determines that position of the device 602 matches the position of the structure 600 (e.g., geographic coordinates associated with the structure 600 and/or the parcel on which the structure 600 is located) within a threshold margin of error, then the address detector 702 may at least partially verify that the address first estimated for the selected structure 600 is accurately estimated. The address detector 702 may perform additional and/or alternative operations in order to verify the first estimation of the address.

If the position of the device 602 does not match the position of the structure 600 (e.g., geographic coordinates associated with the structure 600 and/or the parcel on which the structure 600 is located) within the threshold margin of error, then the address detector 702 may determine that the first estimation of the address may be inaccurate.

With reference to FIG. 6B, the address detector 702 may verify the first estimation of the address based on AR. For example, the address detector 702 may include and/or may be communicatively coupled with an AR component 726. The AR component 726 may be implemented in hardware, software, or firmware (e.g., the AR component 726 may include instructions that may be loaded into memory and, when executed by at least one processor, may cause a device to perform AR operations). The AR component 726 may be configured to perform one or more measurements in order to indicate a position of the device 602/602', and the address detector 702 may verify the first estimation of the address based on the one or more measurements.

In an aspect, the device 602' may be oriented so that the device 602' is approximately perpendicular to the horizon, relatively more than parallel to the horizon; that is, the rotational orientation of the device 602' may be approximately vertical rather than horizontal. Therefore, the line of sight 604' that is orthogonal to the lens of the camera 710 may intersect the wall 620. As illustrated, the device 602' may also be rotationally oriented to be in a "portrait" orientation, as opposed to a "landscape" orientation (although aspects described herein may be applicable to both "portrait" and "landscape").

According to various aspects, the camera 710 may capture image data within a field of view 612 on the wall 620. The image data may be video and/or a plurality of still frames. The wall 620 may be a structural wall that may be selected because the wall 620 is within the field of view 612 of the camera 710 (n.b., "structural wall" does not necessarily imply a load-bearing wall, but may be any wall that is connected with or forms part of a structure). In addition, the IMU 712 may measure one or more of acceleration, rotational orientation, angular rate, angular velocity, etc. The camera 710 may capture the image data contemporaneously with the one or more measurements by the IMU 712.

The AR component 726 may obtain the image data from the camera 710 and, further, may obtain the one or more measurements from the IMU 712. Based on the image data obtained from the camera 710 and the one or more measurements obtained from the IMU 712, the AR component 726 may measure an AR-based distance between the position of the device 602' and the selected wall 620. For example, the AR component 726 may overlay the one or more measurements with the image data in order to calculate the AR-based distance between the position of the device 602' and the selected wall 620.

Illustratively, the AR component 726 may obtain a plurality of acceleration and/or rotational orientation measurements from the IMU, and each of the plurality of measurements may be contemporaneous with a still frame of the image data—e.g., a first acceleration and/or rotational orientation measurement and a first still frame may be associated with a first time step, a second acceleration and/or rotational orientation measurement and a second still frame may be associated with a second time step, and so forth. By overlaying the plurality of measurements with the still frames of the image data, the AR component 726 may calculate the AR-based distance between the position of the device 602' and a focal point 614 on the selected wall 620. The focal point 614 may be within a field of view 612 on the selected wall 620. Accordingly, the AR component 726 may measure a first distance between the position of the device 602' and the focal point 614, which may be an AR-based distance measurement.

In addition, the address detector 702 may determine a point position on a known structural wall that corresponds to the focal point 614. The known structural wall may be a representation of the selected wall 620 in the building information and/or structural footprint information (e.g., as obtained from one or more data sources, such as the data sources 442c-d). For example, the building envelope and/or structural footprint information may represent the structure 600, and the building envelope and/or structural footprint information may indicate respective geographic coordinates that are known for one or more structural walls of the structure 600, including the wall 620.

The address detector 702 may determine the point position by deriving the position of the focal point 614 on the selected wall 620 as represented in the building information and/or structural footprint information. For example, the point position may be the estimated latitudinal and longitudinal coordinates of the focal point 614 on a known structural wall, wherein the known structural wall may be information about a position (e.g., latitudinal and longitudinal coordinates) of the selected wall 620.

In addition to the first distance (e.g., AR-based distance measurement), the address detector 702 may determine a second distance between the position of the device 602' and point position (e.g., the latitudinal and longitudinal coordinates of the focal point 614). The address detector 702 may determine the second distance as the difference between: (1) geographic coordinates indicating the position of the device 602'; and (2) geographic coordinates of the point position (e.g., the estimated coordinates of the focal point 614 when projected onto the known structural wall represented in the building information and/or structural footprint information). The address detector 702 may obtain the geographic coordinates indicating the position of the device 602' through the GNSS component 714 and/or the WiFi component 716.

The address detector 702 may compare the first distance (e.g., AR-based distance) to the second distance, determined by the address detector 702 as the distance between the position of the device 602' and the geographic coordinates of the point position on the known structural wall.

If the address detector 702 determines that first distance (e.g., AR-based distance) matches the second distance within a threshold margin of error, then the address detector 702 may at least partially verify that the address first estimated for the selected structure 600 is accurately estimated. The address detector 702 may perform additional and/or alternative operations in order to verify the first estimation of the address.

If the AR-based distance does not match the second distance with the threshold margin of error, then the address detector 702 may determine that the first estimation of the address is inaccurate. When the address detector 702 determines that the first estimation of the address is inaccurate, then the address detector may estimate a second address for the selected structure. In some aspects, the address detector 702 may repeat the comparison of the AR-based distance to a second distance; however, the second distance in the repeated comparison may be based on different geographic coordinates from building envelope and/or structural footprint information associated with a different structure.

While FIGS. 6A, 6B, and 7 illustrate an approach to AR that is based on measuring a distance between the device 602' and an exterior wall 620 of the structure 600, the present disclosure comprehends aspects in which AR-based distance is measured from an interior wall of the structure 600 while the device 602' is positioned inside of the structure 600.

Figure 8:
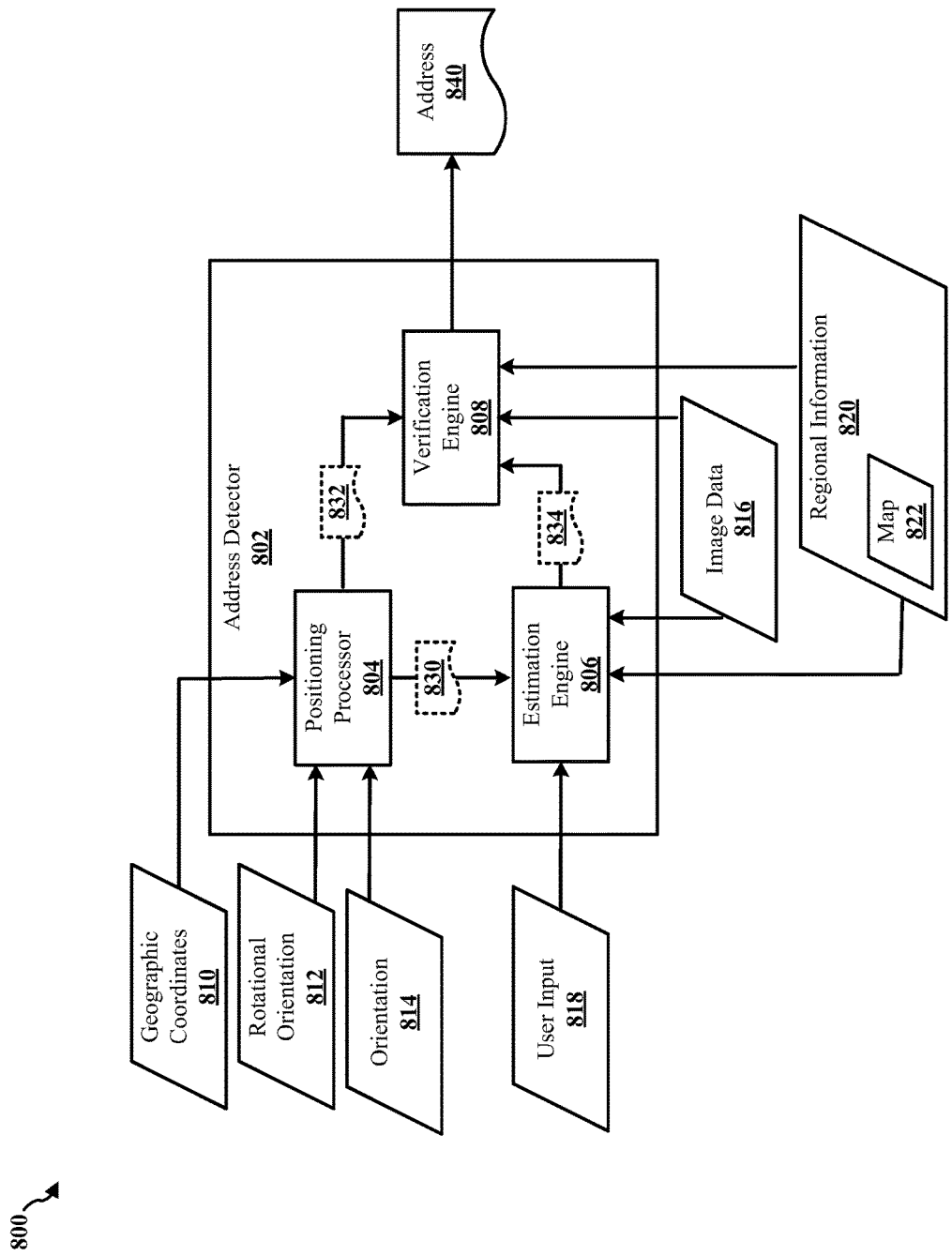
FIG. 8 is a block diagram illustrating an example of an architecture of a computing system.

FIG. 8 illustrates an example of an architecture 800 that includes an address detector 802 for identifying address information of a structure. The address detector 802 may be included in the device 100 of FIG. 1, the device 202 of FIG. 2, the device 302/302' of FIGS. 3A and 3B, and/or the device 602/602' of FIGS. 6A and 6B. The address detector 802 may represent an aspect of the address detector 402 of FIG. 4 and/or the address detector 702 of FIG. 7.

The address detector 802 may be implemented in hardware, software, or firmware. In one aspect, the address detector 802 may include instructions that may be loaded into memory and, when executed by at least one processor, may cause a device to output address information 840.

The address detector 802 may include a positioning processor 804, an estimation engine 806, and a verification engine 808. In various aspects, the positioning processor 804 may be configured to collect positional information that indicates a position of a computing device, such as the computing device in which the address detector 802 is implemented.

The positioning processor 804 may determine the position of the device based on one or more inputs received from one or more other components (e.g., components of the computing device). For example, the positioning processor 804 may obtain a set of geographic coordinates 810 from a GNSS component (e.g., GPS) that indicate a position of the computing device. In some aspects, the positioning processor 804 may obtain other information that indicates a position of the computing device, which may be used instead of or for refinement of the geographic coordinates. For example, the positioning processor 804 may refine the position of the computing device based on WiFi positioning, such as by using signals received from one or more WiFi APs over a WiFi network.

In aspects, the positioning processor 804 may further obtain a rotational orientation 812 of the computing device. The rotational orientation 812 may be provided by an IMU, and may include one or both of gyroscope readings and accelerometer readings. The rotational orientation 812 may indicate whether the computing device is approximately vertical or approximately horizontal with respect to the horizon. Additionally or alternatively, the rotational orientation 812 may indicate whether the computing device is positioned in a "portrait" orientation or a "landscape" orientation.

In aspects, the positioning processor 804 may further obtain an orientation 814 of the computing device relative to magnetic north. The orientation 814 may be provided by a magnetometer. The orientation 814 may indicate a set of compass coordinates or a directional bearing.

Based on one or more of the geographic coordinates 810, the rotational orientation 812, and/or the orientation 814, the positioning processor 804 may determine a position of the computing device. In one example, the positioning processor 804 may determine that the computing device is located within a structure when the rotational orientation 812 indicates that the computing device is rotationally oriented to be approximately horizontal (e.g., approximately parallel to the horizon, as when the computing device is laying or being held flat).

In another example, the positioning processor 804 may determine a line of sight 830 of the computing device. A line of sight 830 may be a line that is orthogonal to a lens of a camera of the computing device, and may indicate what the computing device is oriented toward (e.g., an indication of at what the user of the computing device is looking). Accordingly, the line of sight 830 may be based on the rotational orientation 812 and/or the orientation 814.

In some aspects, the positioning processor 804 may be configured to generate one or more requests that indicate at least a portion of the positional information. For example, the positioning processor 804 may package at least information indicating the geographic coordinates 810 and information indicating the line of sight (e.g., the rotational orientation 812 and/or the orientation 814).

The positioning processor 804 may cause transmission of the one or more requests over a network. Based on the one or more requests, the regional information 820 may be returned over the network. The regional information 820 may include a map 822 representing an area that is proximate to the position of the computing device (e.g., proximate to and/or including the geographic coordinates 810). Additionally, the regional information 820 may include: (1) parcel information indicating one or more geographic positions of one or more parcels, (2) structural footprint information indicating one or more geographic positions of one or more structures, (3) building envelope information indicating one or more building envelopes of one or more structures, (4) one or more elevations (e.g., at which a device is estimated to be positioned), (5) image information depicting one or more structures, and/or (6) address information indicating one or more addresses of one or more parcels and/or structures.

The estimation engine 806 may be configured to determine a selected structure that is proximate to the position of the computing device. The estimation engine 806 may determine the selected structure at least partially based on the positional information 832 that is determined by the positioning processor 804. For example, the estimation engine 806 may determine the selected structure based on the line of sight 830.

In one aspect, the estimation engine 806 may obtain image data 816 from a camera of the computing device. The image data 816 may depict at least a portion of a structure. The estimation engine 806 may obtain user input 818 that indicates selection of the structure. For example, the image data 816 may presented on a display of the computing device, and the user input 818 may indicate selection of a portion of the image data 816 in which the depiction of the structure is positioned. In another example, the user input

818 may be motion of the computing device that causes the camera to capture the structure so that the image data 816 depicts the structure.

The estimation engine 806 may determine a first estimated address 834 corresponding to the selected structure. For example, the estimation engine 806 may plot the position of the computing device on the map 822. Further, the estimation engine 806 may determine the direction that the computing device is oriented with respect to the plotted position of the computing device on the map, which may be indicated by the line of sight 830. The estimation engine 806 may then determine a point on the map 822 that is proximate to the plotted position of the computing device and lies in the direction the computing device is oriented. For example, the estimation engine 806 may determine that the selected structure is the structure located on the parcel closest to the plotted position of the computing device in the direction of the line of sight 830. In another example, the estimation engine 806 may determine that the selected structure is the structure most proximate to the computing device when the line of sight 830 is oriented approximately into the ground (e.g., the computing device may be assumed to be within a structure when the line of sight 830 is directed approximately perpendicular to the horizon).

The estimation engine 806 may estimate an address that corresponds to the point plotted on the map 822. In some aspects, the map 822 may indicate the address. In another aspect, the estimation engine 806 may identify the address corresponding to the point plotted on the map 822 based on additional regional information 820. The estimation engine 806 may provide the estimated address 834 to the verification engine 808.

The verification engine 808 may be configured to verify the estimated address 834 corresponding to the selected structure in order to provide a verified address information 840. In one aspect, the verification engine 808 may be configured to verify the estimated address 834 based on the positional information 832 and/or based on the regional information 820.

In another aspect, the verification engine 808 may obtain an elevation from the positioning processor 804, which may indicate a measured elevation associated with the device (e.g., the device proximate to the parcel on which the selected structure is located). The verification engine 808 may compare the measured elevation to an elevation for the device (e.g., when the device is proximate to the estimated address 834, as indicated in the regional information 820). If the measured elevation matches the elevation indicated in the regional information 820 within a threshold margin of error, then the verification engine 808 may verify that the estimated address 834 is accurate.

In another aspect, the verification engine 808 may obtain the image data 816 that depicts at least a portion of the selected structure. The verification engine 808 may compare the image data 816 to an image indicated in the regional information 820 that depicts the structure corresponding to the estimated address 834. The verification engine 808 may determine whether the at least the portion of the selected structure depicted in the image data 816 matches the image indicated in the regional information 820 that depicts the structure corresponding to the estimated address 834 within a threshold margin of error. If the image data 816 matches the image indicated in the regional information 820 that depicts the structure corresponding to the estimated address 834, then the verification engine 808 may verify that the estimated address 834 is accurate.

In another aspect, the verification engine 808 may plot (e.g., determine and/or estimate) a parcel line corresponding to a parcel on which the selected structure is estimated to be located. The verification engine 808 may plot the parcel line based on at least a portion of the positional information 832. For example, image data 816 may be combined with the positional information 832 in order to identify one or more points corresponding to the parcel on which the selected structure is estimated to be positioned.

The verification engine 808 may use the positional information 832 in combination with the plotted parcel line. In some aspects, the verification engine 808 may plot coordinates that are approximately within the line of sight 830, and therefore may be depicted in image data 816.

The verification engine 808 may determine whether a structure (e.g., a selected structure) is positioned as expected. For example, image data 816 may be combined within the plotted parcel line to determine whether a structure is positioned as indicated in the regional information 820 (e.g., envelope or footprint of the selected structure). In one example, the verification engine 808 may determine that the image data 816 indicates that a structure is located at least partially on the plotted parcel line, and therefore, the verification engine 808 may determine that the verification has at least partially failed because the plotted parcel line intersects a structure (e.g., when a structure should not intersect the parcel line). In another example, the verification engine 808 may determine that the image data 816 indicates that a structure is absent within the plotted parcel line, and therefore, the verification engine 808 may determine that the verification has at least partially failed because the plotted parcel line is estimated to include a structure (e.g., when a structure should not intersect the parcel line).

When the verification engine 808 determines that the selected structure is within the plotted parcel line (e.g., within a margin of error), then the verification engine 808 may at least partially verify that the estimated address corresponds with the actual address for the selected structure. That is, the verification engine 808 may at least partially verify the estimated address of the selected structure because the selected structure is at least partially within the plotted parcel line (and no structure lies on the plotted parcel line). Therefore, the address estimated for the selected structure may be at least partially verified as the address of the selected structure.

In another aspect, the verification engine 808 may be configured to determine that the selected structure is a structure in which the computing device is currently positioned or most proximate, e.g., when the line of sight 830 is indicated to be directed into the ground (as when the computing device is approximately horizontal). Accordingly, the verification engine 808 may determine that the selected structure is the structure located on a parcel corresponding to (or closest to) the plotted position of the computing device on the map 822.

The verification engine 808 may determine that the selected structure is the structure located on a parcel corresponding to (or closest to) the position of the computing device on the map 822 based on a margin of error. For example, if the positional information 832 indicates that geographic coordinates of the computing device correspond to geographic coordinates of the selected structure indicated by the map 822 within an acceptable margin of area (e.g., when the line of sight 830 is directed approximately into the ground), then verification engine 808 may determine that the selected structure is the structure located on a parcel most proximate to the position of the computing device. Further, if the positional information 832 indicates that geographic coordinates of the computing device do not correspond to geographic coordinates of the selected structure (e.g., the acceptable margin of error is unsatisfied or exceeded), then verification engine 808 may determine that the computing device is not within the selected structure and/or not within the parcel.

In another aspect, the verification engine 808 may use AR to verify the estimated address 834. For example, the verification engine 808 may measure a first distance between the position of the computing device and a focal point on a selected structural wall of the selected structure—e.g., the line of sight 830 may intersect the selected structural wall at a focal point. The verification engine 808 may cause a camera of the computing device to capture a plurality of images along the line of sight 830. Contemporaneously, the positioning processor 804 may obtain IMU measurements, such as accelerometer readings and/or gyroscope readings. The verification engine 808 may overlay the IMU measurements with the plurality of images so that the first distance between the position of the computing device and the focal point on the selected structural wall may be measured through AR.

In addition, the verification engine 808 may determine a point position on a known structural wall that corresponds to the focal point. For example, the point position may be latitudinal and longitudinal coordinates that represent the focal point on a known structural wall shown on the structural footprint and/or building envelope (included in the regional information 820). The verification engine 808 may determine a second distance between the point position (e.g., coordinates derived from the focal point) and the positional information 832 of the computing device (e.g., GPS coordinates of the computing device). The verification engine 808 may determine whether first distance matches the second distance within a threshold margin of error. If the first distance matches the second distance, then the verification engine 808 may verify that the estimated address 834 is accurate. Otherwise, the verification engine 808 may determine that the estimated address 834 is inaccurate.

In some aspects, the verification engine 808 may determine that the estimated address 834 is inaccurate. Accordingly, the estimation engine 806 may retry the estimation of the address. For example, the estimation engine 806 may identify a different address. The estimation engine 806 may then provide the different address to the verification engine 808 in order to determine if the different address is accurate.

In some aspects, the verification engine 808 may weight one or more of the aforementioned techniques for verifying the estimation of the address. Accordingly, if one technique fails, the estimation may still be verified if a technique that is given greater weight succeeds. For example, the elevation estimation may be more greatly weighted by the verification engine 808 than the AR-based distance estimation, and therefore, the verification of the address estimation may succeed when the elevation estimation is verified but the AR-based distance estimation is unverified.

In various aspects, the regional information 820 may include regional information for a plurality of parcels and/or structures. For example, the regional information 820 may include additional parcel information, additional structural footprint information, additional building envelope information, additional elevation information, additional images, and/or additional address information. This additional information may be stored in memory (e.g., cached) in order to reduce the overhead commensurate with identifying and verifying other addresses.

The positioning processor 804 may dynamically update the positional information of the computing device, e.g., as the computing device is moved by a user. When the positioning processor 804 determines new or updated positional information, the positional information may be provided to the estimation engine 806. The estimation engine 806 may determine a new or updated selected structure, and estimate the address for the new selected structure based on the stored regional information 820. Illustratively, the computing device may be rotated 360° and the estimation engine 806 may be configured to estimate a respective address for each structure in each section of those 360° by quickly accessing the cached regional information 820.

Figure 9:
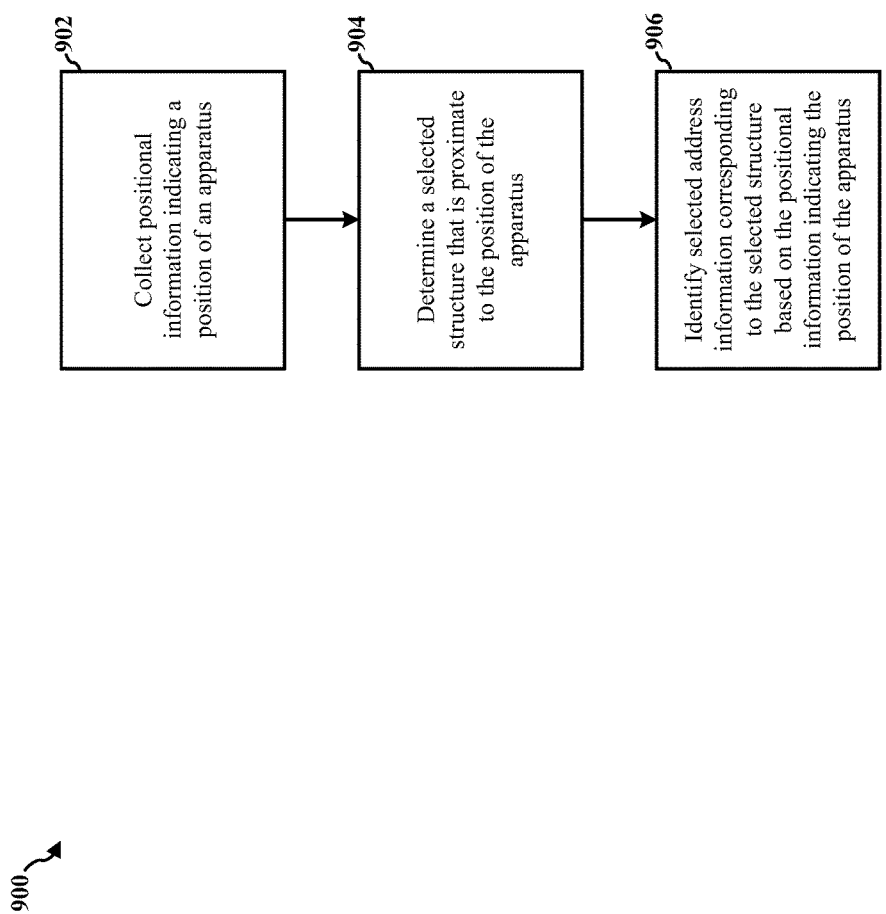
FIG. 9 is a flowchart of a method of identifying address information associated with a structure that is proximate to a computing device.

FIG. 9 illustrates a method 900 for identifying address information corresponding to a structure, in accordance with various aspects of the present disclosure. In various aspects, the method 900 may be performed by an apparatus. Examples of apparatuses include the device 100 of FIG. 1, the device 202 of FIG. 2, the device 302/302' of FIG. 3, and/or the device 602/602' of FIGS. 6A and 6B. In various aspects, the method 900 may be performed by a hardware component, a software component, or a firmware component. For example, the method 900 may be performed by the address detector 402 of FIG. 4, the address detector 702 of FIG. 7, and/or the address detector 802 of FIG. 8. While FIG. 9 illustrates a series of discrete operations, one or more of the operations may be transposed, omitted, and/or contemporaneously performed.

Starting with operation 902, an apparatus may collect positional information indicating a position of the apparatus. For example, the apparatus may obtain at least one of: (1) a set of geographic coordinates associated with a position of the apparatus, (2) an orientation of the apparatus relative to magnetic north, and/or (3) a rotational orientation of the apparatus. In another example, the apparatus may collect positional information using WiFi positioning.

Referring to FIGS. 3A, 3B, 4, and 5, the address detector 402 may collect positional information indicating a position of the device 302/302'. For example, the address detector 402 may obtain at least one of: (1) a set of geographic coordinates from the GNSS component 414, (2) an orientation 306/306' of the device 302/302' relative to magnetic north from the IMU 412, (3) a rotational orientation of the device 302/302' from the IMU 412, and/or (4) WiFi positioning information from the WiFi component 416. Referring to FIGS. 6A, 6B, and 7, the address detector 702 may collect positional information indicating a position of the device 602/602'. For example, the address detector 702 may obtain positional information from one or more of the GNSS component 714, the IMU 712, and/or the WiFi component 716. Referring to FIG. 8, the positioning processor 804 may obtain the geographic coordinates 810, the rotational orientation 812, and/or the orientation 814 relative to magnetic north.

At operation 904, the apparatus may determine a selected structure that is proximate to a position of the apparatus. For example, the apparatus may plot the position of the apparatus on a map. Further, the apparatus may determine a direction in which the apparatus is oriented on the map (e.g., the orientation of the apparatus relative to magnetic north), which may be the line of sight of the apparatus. The apparatus may determine that a structure is selected when the structure (or the parcel on which the structure is located) is proximate to the apparatus, such as the structure (or parcel) that is closest to the plotted position of the apparatus on the map, relative to other structures. Further, the apparatus may determine the structure is selected when the structure (or the parcel on which the structure is located) lies within the line of sight of the apparatus, as represented on the map. In other words, the apparatus may determine that a structure is selected when that structure is the closest structure to the apparatus within the line of sight (e.g., a focal point) of the apparatus.

Referring to FIGS. 3A, 3B, 4, and 5, the address detector 402 may determine a selected structure that is proximate to the position of the device 302/302'. For example, the address detector 402 may determine that the second structure 314b is a selected structure that is proximate to the position 308 of the device 302. In another example, the address detector 402 may determine that the third structure 314c is a selected structure that is proximate to the refined position 340 of the device 302'. Referring to FIGS. 6A, 6B, and 7, the address detector 702 may determine that the structure 600 is a selected structure that is proximate to the position of the device 602/602'. Referring to FIG. 8, the estimation engine 806 may determine a selected structure that is proximate to the position of the computing device.

At operation 906, the apparatus may identify selected address information corresponding to the selected structure based on the positional information indicating the position of the computing device. In aspects, the selected address information indicates an alphanumeric identifier that is specific to the selected structure. For example, the apparatus may identify an address for a structure that is proximate to the apparatus, and the apparatus may determine that the identified address corresponds to the selected structure. Therefore, the apparatus may identify the selected address information corresponding to the selected structure includes the identified address.

Referring to FIGS. 3A, 3B, 4, and 5, the address detector 402 may identify 122 Steele St., Los Angeles, Calif. 90035 as the selected address information corresponding to the selected second structure 314b based on the positional information corresponding to the device 302. In another example, the address detector 402 may identify 121 Steele St., Los Angeles, Calif. 90035 as the selected address information corresponding to the selected third structure 314c based on the positional information corresponding to the device 302'. Referring to FIGS. 6A, 6B, and 7, the address detector 702 may identify selected address information corresponding to the selected structure 600, e.g., based on the line of sight 604/604'. Referring to FIG. 8, the estimation engine 806 may estimate the estimated address 834 corresponding to the selected structure based on positional information (e.g., the line of sight 830) determined by the positioning processor 804.

Figure 10A:
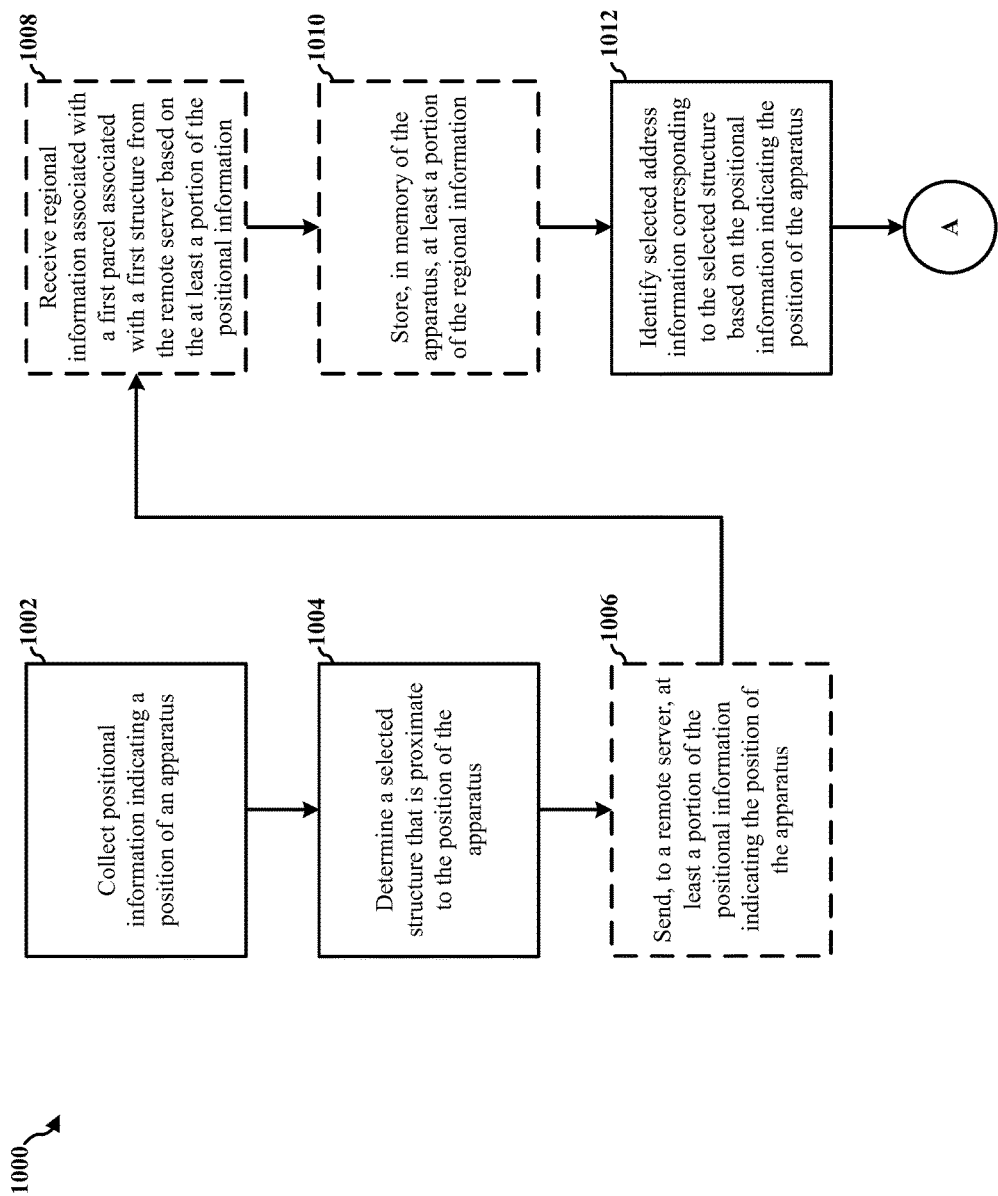
FIGS. 10A and 10B are a flowchart of a method of identifying address information associated with a structure that is proximate to a computing device.
Figure 10B:
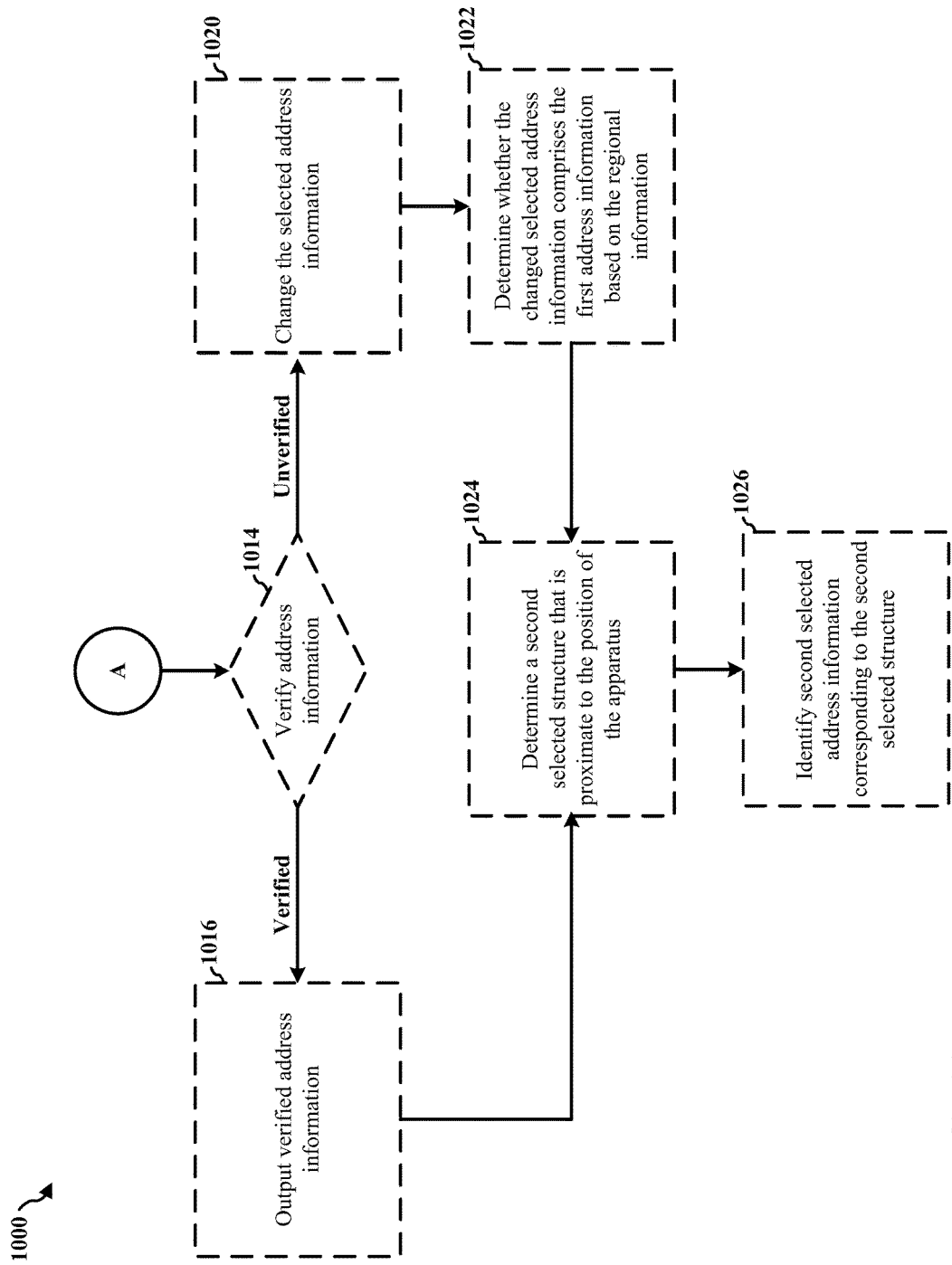

FIGS. 10A and 10B illustrate a method 1000 for identifying address information corresponding to a structure, in accordance with various aspects of the present disclosure. In various aspects, the method 1000 may be performed by an apparatus. Examples of apparatuses include the device 100 of FIG. 1, the device 202 of FIG. 2, the device 302/302' of FIG. 3, and/or the device 602/602' of FIGS. 6A and 6B. In various aspects, the method 1000 may be performed by a hardware component, a software component, or a firmware component. For example, the method 1000 may be performed by the address detector 402 of FIG. 4, the address detector 702 of FIG. 7, and/or the address detector 802 of FIG. 8.

While FIG. 10 illustrates a series of discrete operations, one or more of the operations may be transposed, omitted, and/or contemporaneously performed. For example, optional operations may be illustrated with dashed lines.

Starting with operation 1002, an apparatus may collect positional information indicating a position of the apparatus. For example, the apparatus may obtain at least one of: (1) a set of geographic coordinates associated with a position of the apparatus, (2) an orientation of the apparatus relative to magnetic north, and/or (3) a rotational orientation of the apparatus. In another example, the apparatus may collect positional information using WiFi positioning.

Referring to FIGS. 3A, 3B, 4, and 5, the address detector 402 may collect positional information indicating a position of the device 302/302'. For example, the address detector 402 may obtain at least one of: (1) a set of geographic coordinates from the GNSS component 414, (2) an orientation 306/306' of the device 302/302' relative to magnetic north from the IMU 412, (3) a rotational orientation of the device 302/302' from the IMU 412, and/or (4) WiFi positioning information from the WiFi component 416. Referring to FIGS. 6A, 6B, and 7, the address detector 702 may collect positional information indicating a position of the device 602/602'. For example, the address detector 702 may obtain positional information from one or more of the GNSS component 714, the IMU 712, and/or the WiFi component 716. Referring to FIG. 8, the positioning processor 804 may obtain the geographic coordinates 810, the rotational orientation 812, and/or the orientation 814 relative to magnetic north.

At operation 1004, the apparatus may determine a selected structure that is proximate to a position of the apparatus. For example, the apparatus may plot the position of the apparatus on a map. Further, the apparatus may determine a direction in which the apparatus is oriented on the map (e.g., the orientation of the apparatus relative to magnetic north), which may be the line of sight of the apparatus (e.g., the line of sight may intersect the selected structure at a focal point). The apparatus may determine that a structure is selected when the structure (or the parcel on which the structure is located) is proximate to the apparatus, such as the structure (or parcel) that is closest to the plotted position of the apparatus on the map, relative to other structures. Further, the apparatus may determine the structure is selected when the structure (or the parcel on which the structure is located) lies within the line of sight of the apparatus, as represented on the map. In other words, the apparatus may determine that a structure is selected when that structure is the closest structure to the apparatus within the line of sight of the apparatus.

Referring to FIGS. 3A, 3B, 4, and 5, the address detector 402 may determine a selected structure that is proximate to the position of the device 302/302'. For example, the address detector 402 may determine that the second structure 314b is a selected structure that is proximate to the position 308 of the device 302. In another example, the address detector 402 may determine that the third structure 314c is a selected structure that is proximate to the refined position 340 of the device 302'. Referring to FIGS. 6A, 6B, and 7, the address detector 702 may determine that the structure 600 is a selected structure that is proximate to the position of the device 602/602'. Referring to FIG. 8, the estimation engine 806 may determine a selected structure that is proximate to the position of the computing device.

At operation 1006, the apparatus may send, to a remote server, at least a portion of the positional information indicating the position of the apparatus. In some aspects, the apparatus may package at least a portion of the positional information for transmission over a network—e.g., the apparatus may generate one or more requests that include geographic coordinates and/or information indicating the orientation relative to magnetic north and rotational orientation (e.g., the line of sight of the apparatus). The apparatus may send the packaged position information over the network, e.g., in order to request regional information associated with the position of the apparatus.

Referring to FIGS. 3A, 3B, 4, and 5, the address detector 402 may send, over the network 440 to one or more of the data sources 442a-g, at least a portion of the positional information indicating the position of the device 302/302'. Referring to FIGS. 6A, 6B, and 7, the address detector 702 may send, over the network 740 to one or more data sources, at least a portion of the positional information indicating a position of the device 602/602'. Referring to FIG. 8, the positioning processor 804 may send, over a network to one or more data sources, at least a portion of the positional information 832.

At operation 1008, the apparatus may receive regional information associated with a first parcel associated with a first structure from a remote server based on the at least the portion of the positional information. For example, based on one or more requests sent over a network to one or more data sources, the apparatus may receive regional information that includes information about one or more parcels and respective structure(s) located thereon. In one aspect, the regional information may include one or more of: (1) first parcel information indicating a geographic position associated with the first parcel, (2) first structural footprint information indicating a geographic position associated with the first structure, (3) first building envelope information associated with the first structure, (4) a first elevation associated with the apparatus, (5) a first geographic map that includes at least a portion of the first structure, (6) a first image that includes at least a portion of the first structure, and/or (7) first address information associated with the first structure.

Referring to FIGS. 3A, 3B, 4, and 5, the address detector 402 may receive, over the network 440 from one or more of the data sources 442a-g, the regional information 520a-g associated with the second parcel 310b and associated with the second structure 314b. Referring to FIGS. 6A, 6B, and 7, the address detector 702 may receive, over the network 740 from one or more data sources, regional information associated with the structure 600. Referring to FIG. 8, the estimation engine 806 and/or the verification engine 808 may receive, over a network from one or more data sources, at least a portion of the regional information 820 that includes the map 822.

At operation 1010, the apparatus may store, in memory of the apparatus, at least a portion of the regional information. For example, the apparatus may cache at least a portion of the regional information. In various aspects, the stored portion of regional information may include one or more of: (1) second parcel information indicating a geographic position associated with a second parcel, (2) second structural footprint information indicating a geographic position associated with a second structure, (3) second building envelope information associated with the second structure, (4) a second elevation associated with the apparatus (e.g., when the apparatus moves to a different position), (5) a second geographic map that includes at least a portion of the second structure, (6) a second image that includes at least a portion of the second structure, and/or (7) second address information associated with the second structure.

Referring to FIGS. 3A, 3B, 4, and 5, the address detector 402 may store, in the data store 420, at least a portion of the regional information 520a-g associated with the second parcel 310b and associated with the second structure 314b. In some aspects, the stored portion of the regional informa-tion 520a-g may include regional information associated with the third parcel 310c and/or the third structure 314c. Referring to FIGS. 6A, 6B, and 7, the address detector 702 may store, in the data store 720, at least a portion of the regional information associated with the structure 600. Referring to FIG. 8, the estimation engine 806 and/or the verification engine 808 may store at least a portion of the regional information 820 that includes the map 822.

At operation 1012, the apparatus may identify selected address information corresponding to the selected structure based on the positional information indicating the position of the computing device. In aspects, the selected address information indicates an alphanumeric identifier that is specific to the selected structure. For example, the apparatus may identify an address for a structure that is proximate to the apparatus, and the apparatus may determine that the identified address corresponds to the selected structure. Therefore, the apparatus may identify the selected address information corresponding to the selected structure includes the identified address.

In some aspects, the apparatus may estimate the address corresponding to the selected structure. The apparatus may estimate the address corresponding to the selected structure based at least in part on the regional information. For example, the apparatus may plot the position and line of sight of the apparatus on a map included in the regional information, and the apparatus may estimate an address of a structure represented on the map that is proximate to the position and within the line of sight. The address of the structure may be indicated in the address information included in the regional information.

Referring to FIGS. 3A, 3B, 4, and 5, the address detector 402 may identify 122 Steele St., Los Angeles, Calif. 90035 as the selected address information corresponding to the selected second structure 314b based on the positional information corresponding to the device 302. In another example, the address detector 402 may identify 121 Steele St., Los Angeles, Calif. 90035 as the selected address information corresponding to the selected third structure 314c based on the positional information corresponding to the device 302'. Referring to FIGS. 6A, 6B, and 7, the address detector 702 may identify selected address information corresponding to the selected structure 600, e.g., based on the line of sight 604/604'. Referring to FIG. 8, the estimation engine 806 may estimate the estimated address 834 corresponding to the selected structure based on positional information (e.g., the line of sight 830) determined by the positioning processor 804.

At operation 1014, the apparatus may verify, based on the regional information, whether the selected address information comprises first address information based on the regional information. For example, the apparatus may determine whether the address first estimated to correspond to the selected structure is the actual address (e.g., first address) of the selected structure. Various aspects for verifying whether the selected address information comprises the first address information based on the regional information may be described herein, e.g., with respect to FIGS. 12A, 12B, 12C, and 12D, infra.

Referring to FIGS. 3A, 3B, 4, and 5, the address detector 402 may verify that the selected address information corresponding to the selected second structure 314b is the first address information corresponding to the selected second structure 314b based on the regional information 520a-g. In another example of FIG. 3B, the address detector 402 may verify that the selected address information corresponding to the selected third structure 314c is the first address information corresponding to the selected third structure 314c based on the regional information 520a-g. Referring to FIGS. 6A, 6B, and 7, the address detector 702 may verify that the selected address information corresponding to the selected structure 600 is the first address information corresponding to the selected structure 600 based on the regional information 520a-g. Referring to FIG. 8, the verification engine 808 may verify the estimated address 834 corresponding to the selected structure based on the regional information 820.

If the selected address information is verified to comprise the first address information (e.g., if the estimated address is correct), then the method 1000 may proceed to operation 1016. At operation 1016, the apparatus may output the selected address information. For example, the apparatus may cause the selected address information to be presented on a display of the apparatus, and/or the apparatus may provide the selected address information to a component (e.g., application) of the apparatus.

Referring to FIGS. 3A, 3B, 4, and 5, the address detector 402 may output the selected address information corresponding to the second structure 314b, such as by presenting the address on the user interface 424. Referring to FIGS. 6A, 6B, and 7, the address detector 702 may output the selected address information corresponding to the structure 600, such as by presenting the address on the user interface 724. Referring to FIG. 8, the verification engine 808 may output the address information 840.

If the selected address information is unverified to comprise the first address information (e.g., if the estimated address is incorrect), then the method 1000 may proceed to operation 1020. At operation 1020, the apparatus may change the selected address information. In other words, the apparatus may estimate a different address that corresponds to the selected structure. For example, the apparatus may identify a parcel or structure that neighbors the parcel or structure corresponding to the first (e.g., inaccurate) estimated address, which may be indicated by the map or address information. The apparatus may change the selected address information to comprise the address information corresponding to the neighboring parcel or structure.

Referring to FIGS. 3A, 3B, 4, and 5, the address detector 402 may change the selected address information to different address information. For example, if the address detector estimated the selected address information for the second structure 314b to be 124 Steele St., Los Angeles, Calif. 90035, then the address detector 402 may change the selected address information to comprise 122 Steele St., Los Angeles, Calif. 90035. Referring to FIGS. 6A, 6B, and 7, the address detector 702 may change the selected address information to different address information. Referring to FIG. 8, the estimation engine 806 and/or the verification engine 808 may change the selected address information to different address information.

At operation 1022, the apparatus may determine whether the changed selected address information comprises the first address information. That is, the apparatus may determine whether the selected address information, estimated for the selected structure, is the actual address of that selected structure. Various aspects for verifying whether the selected address information comprises the first address information based on the regional information may be described herein, e.g., with respect to FIGS. 12A, 12B, 12C, and 12D, infra.

Referring to FIGS. 3A, 3B, 4, and 5, the address detector 402 may determine whether the changed selected address information comprises the first address information (e.g., verify whether the address information estimated for the second structure 314b is the address information for the second structure 314b). Referring to FIGS. 6A, 6B, and 7, the address detector 702 may determine whether the changed selected address information comprises the first address information. Referring to FIG. 8, the verification engine 808 may determine whether the selected address information comprises the first address information.

Proceeding to operation 1024, the apparatus may determine a second selected structure that is proximate to the position of the apparatus. Because the apparatus may store (e.g., cache) regional information that includes information about a plurality of parcels and/or structures, the apparatus may sweep around the environment surrounding the first selected structure in order to quickly identify address information corresponding to other structures. For example, the apparatus may be positioned so that a line of sight intersects a different structure, and the different structure may be selected based on the line of sight.

Referring to FIGS. 3A, 3B, 4, and 5, the address detector 402 may determine the third structure 314c is selected based on the position of the device 302'. Referring to FIGS. 6A, 6B, and 7, the address detector 702 may determine a second selected structure, e.g., when the device 602/602' is relocated outside of the structure 600. Referring to FIG. 8, the estimation engine 806 may determine a second selected structure.

At operation 1026, the apparatus may identify second selected address information corresponding to the second selected structure. For example, the apparatus may identify an address for a second structure that is proximate to the apparatus (n.b., proximate may not necessarily mean most proximate). The apparatus may determine that the identified second selected address corresponds to the second structure. Therefore, the apparatus may identify the selected second address information corresponding to the second structure includes the identified second address information.

Referring to FIGS. 3A, 3B, 4, and 5, the address detector 402 may identify second selected address information corresponding to the third structure 314c that is proximate to the position of the device 302'. Referring to FIGS. 6A, 6B, and 7, the address detector 702 may identify second selected address information corresponding to a second selected structure, e.g., when the device 602/602' is relocated outside of the structure 600. Referring to FIG. 8, the estimation engine 806 may identify second selected address information corresponding to a second selected structure.

Figure 11A:
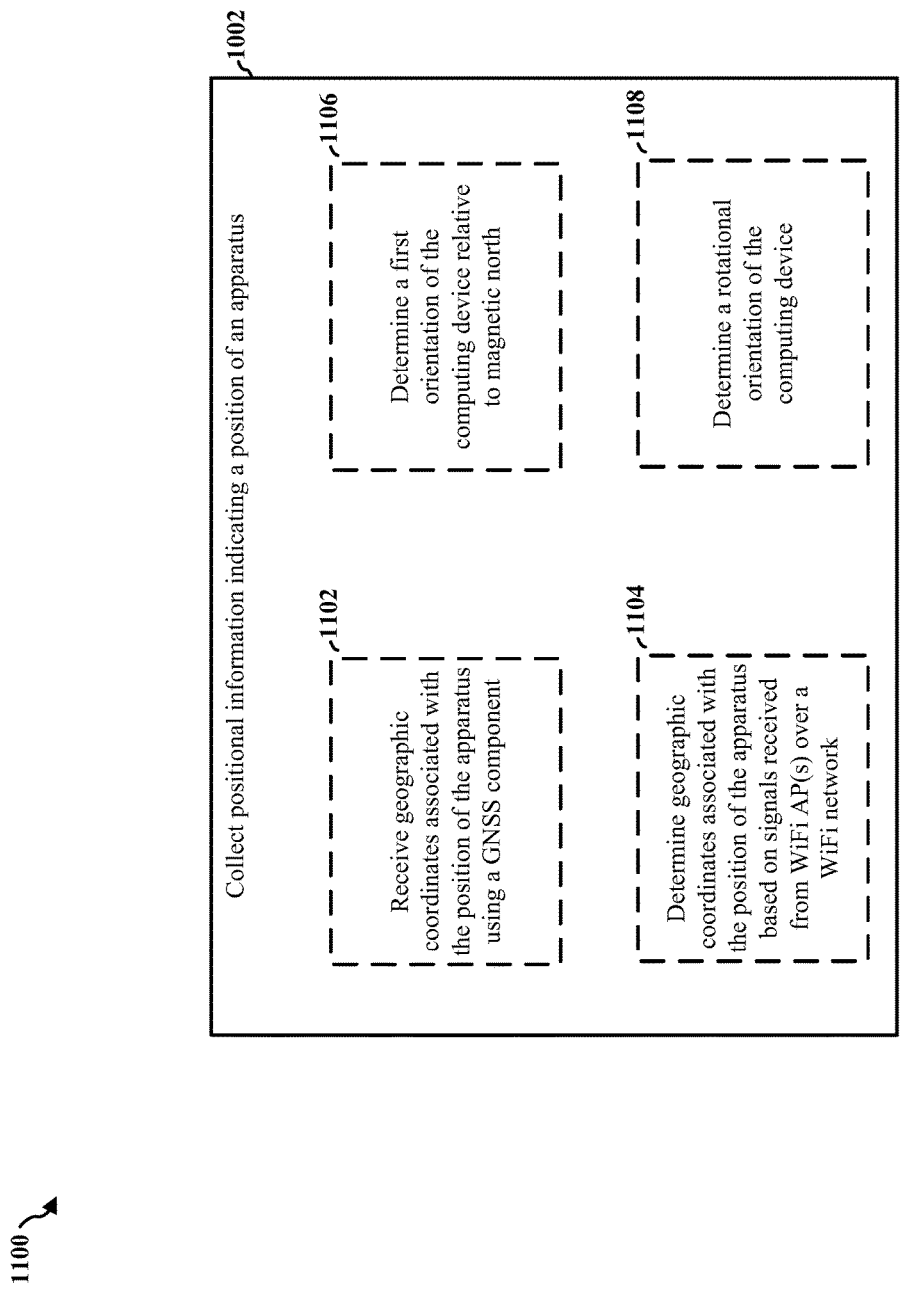
FIGS. 11A and 11B are flowcharts of methods of identifying address information associated with a structure that is proximate to a computing device.

Turning to FIG. 11A, a method 1100 show one or more aspects of operation 1002. That is, the apparatus may collect positional information indicating a position of the apparatus based on one or more of operations 1102, 1104, 1106, 1108.

At operation 1102, the apparatus may receive geographic coordinates associated with a position of the apparatus using a GNSS component. Referring to FIGS. 3A, 3B, 4, and 5, the GNSS component 414 may provide geographic coordinates to the address detector 402. Referring to FIGS. 6A, 6B, and 7, the GNSS component 714 may provide geographic coordinates to the address detector 702. Referring to FIG. 8, the positioning processor 804 may receive the geographic coordinates 810.

At operation 1104, the apparatus may determine geographic coordinates associated with the position of the apparatus based on signals received from at least one WiFi AP over a WiFi network. Referring to FIGS. 3A, 3B, 4, and 5, the address detector 402 may determine geographic coordinates based on WiFi positioning using the WiFi component 416. Referring to FIGS. 6A, 6B, and 7, the address detector 702 may determine geographic coordinates based on WiFi positioning using the WiFi component 716. Referring to FIG. 8, the positioning processor 804 may receive the geographic coordinates 810.

At operation 1106, the apparatus may determine a first orientation of the apparatus relative to magnetic north. That is, the apparatus may obtain compass coordinates and/or a direction of bearing, e.g., from a magnetometer of the apparatus. Referring to FIGS. 3A, 3B, 4, and 5, the IMU 412 may provide an orientation to the address detector 402. Referring to FIGS. 6A, 6B, and 7, the IMU 712 may provide an orientation to the address detector 702. Referring to FIG. 8, the positioning processor 804 may receive the orientation 814.

At operation 1108, the apparatus may determine a rotational orientation of the apparatus. That is, the apparatus may obtain a rotational orientation in at least one of six degrees of freedom, e.g., from a gyroscope and/or accelerometer of the apparatus. Referring to FIGS. 3A, 3B, 4, and 5, the IMU 412 may provide a rotational orientation to the address detector 402. Referring to FIGS. 6A, 6B, and 7, the IMU 712 may provide a rotational orientation to the address detector 702. Referring to FIG. 8, the positioning processor 804 may receive the rotational orientation 812.

Figure 11B:
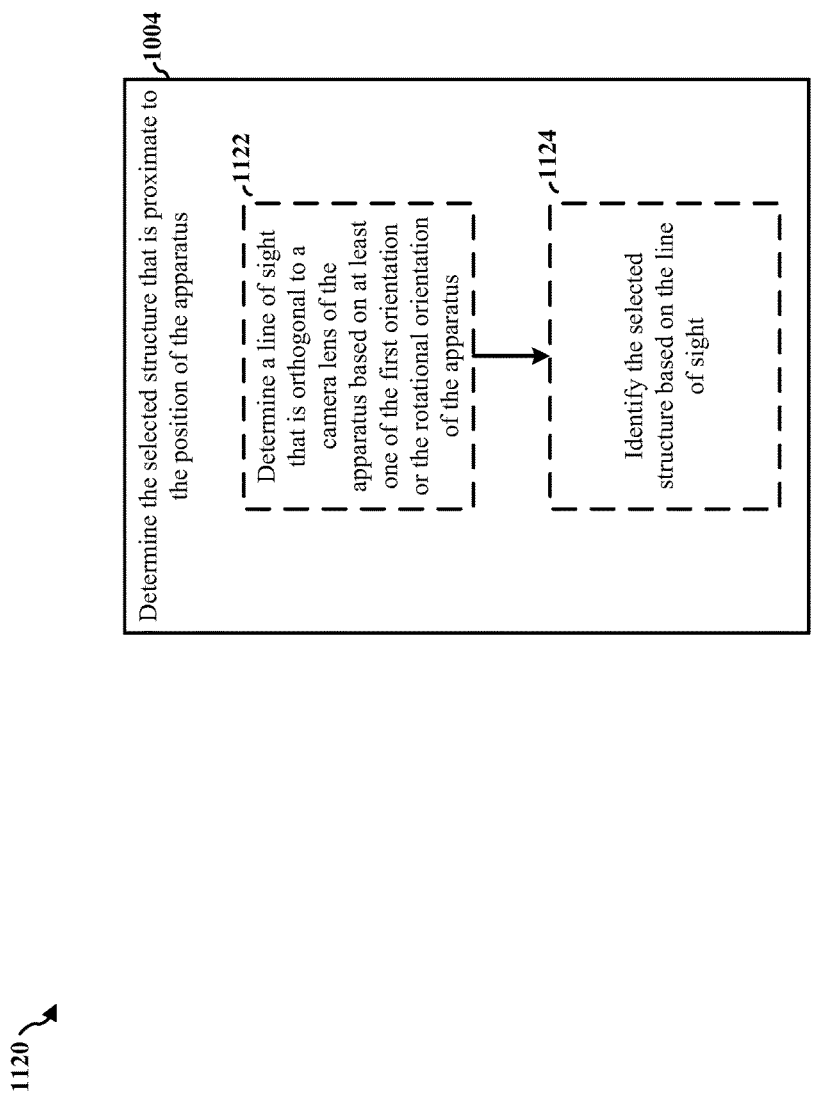

FIG. 11B illustrate an aspect of operation 1004. That is, the apparatus may determine the selected structure that is proximate to the position of the apparatus based on operations 1122, 1124.

At operation 1122, the apparatus may determine a line of sight that is orthogonal to a camera lens of the apparatus based on at least one of the first orientation or the rotational orientation of the apparatus. In some aspects, the line of sight may intersect the selected structure at a focal point. Referring to FIGS. 3A, 3B, 4, and 5, the address detector 402 may determine a line of sight that is orthogonal to a lens of the camera 410. Referring to FIGS. 6A, 6B, and 7, the address detector 702 may determine a line of sight that is orthogonal to a lens of the camera 710. Referring to FIG. 8, the positioning processor 804 may determine a line of sight that is orthogonal to a lens of a camera.

At operation 1124, the apparatus may identify the selected structure based on the line of sight. For example, the apparatus may plot the position of the apparatus one a map, and the apparatus may identify a structure on the map that is intersected by the line of sight (e.g., lies in the line of sight of the plotted position of the apparatus). Referring to FIGS. 3A, 3B, 4, and 5, the address detector 402 may identify the second structure 314b as the selected structure. Referring to FIGS. 6A, 6B, and 7, the address detector 702 may identify the structure 600 as the selected structure. Referring to FIG. 8, the estimation engine 806 may identify a selected structure.

Figure 12A:
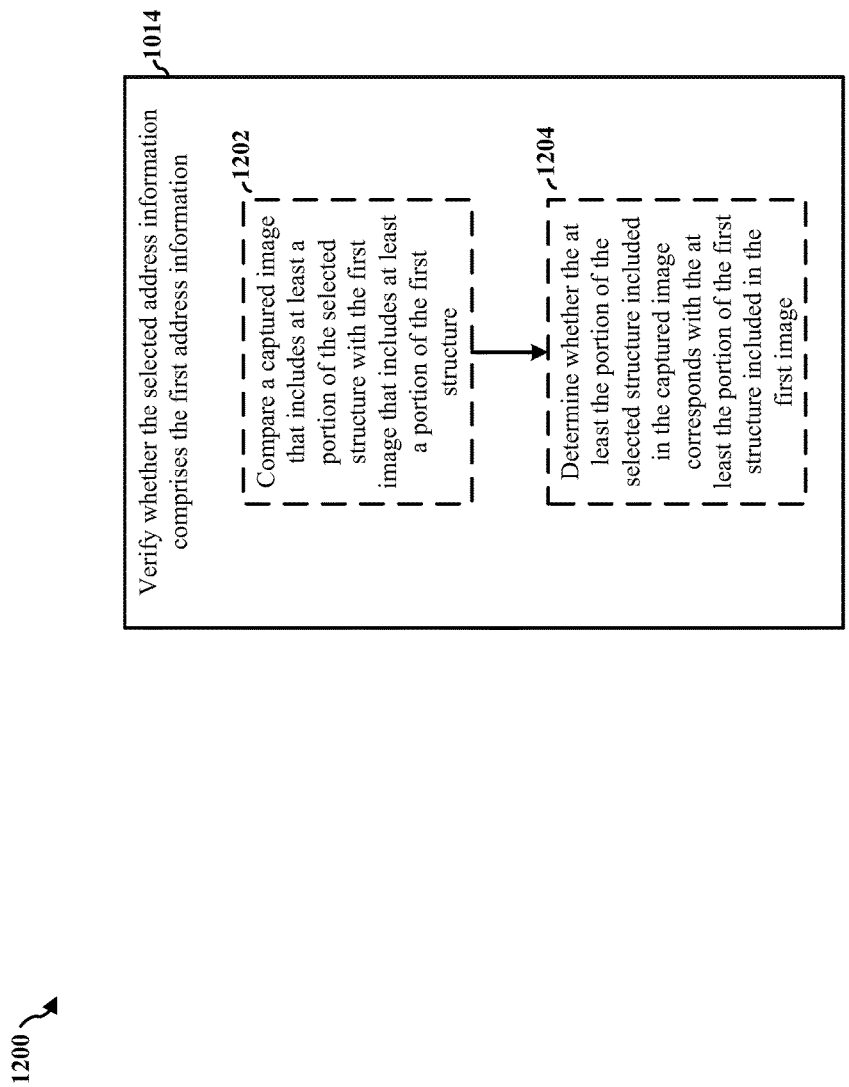
FIGS. 12A, 12B, 12C, and 12D are flowcharts of methods of identifying address information associated with a structure that is proximate to a computing device.

FIG. 12A illustrates a method 1200 that may be an aspect of operation 1014. That is, the verification of whether the selected address information comprises the first address information may be based on operations 1202, 1204. At operation 1202, the apparatus may compare a captured image that includes at least a portion of the selected structure with the first image that includes a portion of the first structure. The captured image may be captured by a camera of the apparatus. In other words, the apparatus may compare an image that is captured of the selected structure with another image that depicts the actual structure located at the selected address information (e.g., the estimated address). Referring to FIGS. 3A, 3B, 4, and 5, the address detector 402 may compare an image that is captured of the selected second structure 314b with an image from the image information 520f corresponding to the selected address information. Referring to FIGS. 6A, 6B, and 7, the address detector 702 may compare an image that is captured of the structure 600 with an image from image information. Referring to FIG. 8, the verification engine 808 may compare an image that is captured of the selected structure with an image from the regional information 820.

At operation 1204, the apparatus may determine whether the at least the portion of the selected structured included in the captured image corresponds with the at least the portion of the first structure included in the first image. In other words, the apparatus may determine whether the image captured of the selected structure matches another image of a structure that is located at the address estimated to correspond to the selected structure. If the selected structure depicted in the captured image corresponds (e.g., matches within a threshold margin of error) to the first structure included in the first image, then the selected address information may be verified to include the first address information (e.g., the selected address information is accurate). Otherwise, the selected address information may be unverified.

Referring to FIGS. 3A, 3B, 4, and 5, the address detector 402 may determine whether the selected second structure 314b depicted in a captured image corresponds with a first structure corresponding to the selected address information depicted in the image information 520f Referring to FIGS. 6A, 6B, and 7, the address detector 702 may determine whether an image that is captured of the structure 600 corresponds with an image from image information. Referring to FIG. 8, the verification engine 808 may determine whether an image that is captured of the selected structure corresponds with an image from the regional information 820.

Figure 12B:
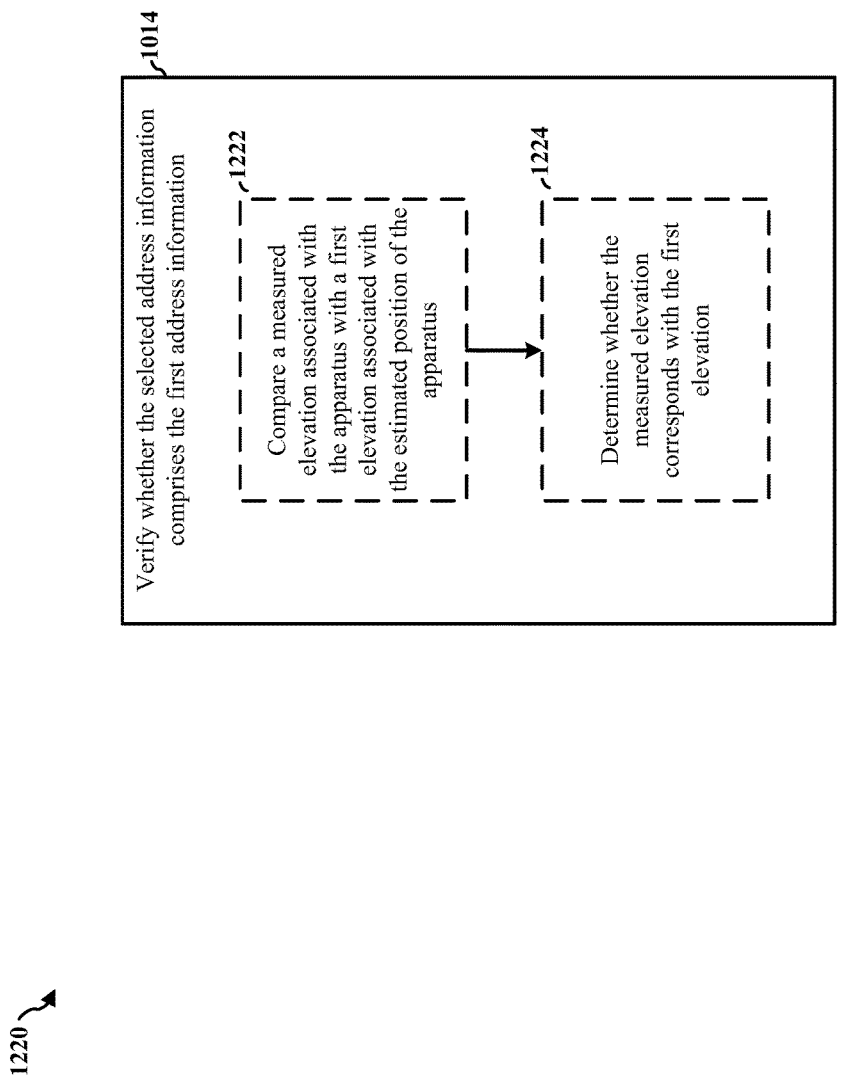

FIG. 12B illustrates a method 1220 that may be an aspect of operation 1014. That is, the verification of whether the selected address information comprises the first address information may be based on operations 1222, 1224. At operation 1222, the apparatus may compare a measured elevation associated with the apparatus with a first elevation associated with the estimated position of the apparatus. For example, the apparatus may compare an elevation at which the apparatus is located when proximate to the selected structure to another elevation that is indicated in the regional information to be the elevation at the position (e.g., latitude and longitude) at which the apparatus is estimated to be located.

Referring to FIGS. 3A, 3B, 4, and 5, the address detector 402 may compare an elevation that is measured by the barometer 422 with an elevation from the elevation information 520e corresponding to a position 308/308' (e.g., latitude and longitude coordinates) at which the device 302/302' is estimated to be positioned. Referring to FIGS. 6A, 6B, and 7, the address detector 702 may compare an elevation measured for the device 602/602' to an elevation corresponding to a position (e.g., latitude and longitude coordinates) at which the device 602/602' is estimated to be positioned. Referring to FIG. 8, the verification engine 808 may compare an elevation measured by the positioning processor 804 to an elevation associated with the device implementing the architecture 800 (e.g., the elevation may be indicated by the regional information 820).

At operation 1224, the apparatus may determine whether the measured elevation corresponds with the first elevation. In other words, the apparatus may determine whether the elevation measured for the apparatus matches an elevation of a position (e.g., latitude/longitude coordinates) at which the apparatus is estimated to be positioned. If the measured elevation corresponds (e.g., matches within a threshold margin of error) to the first elevation included in the regional information, then the selected address information may be verified to include the first address information (e.g., the selected address information is accurate). Otherwise, the selected address information may be unverified.

Referring to FIGS. 3A, 3B, 4, and 5, the address detector 402 may determine whether the measured elevation corresponding to the device 302/302' corresponds with an elevation of the position 308/308' estimated for the device 302/302', which may be indicated in the elevation information 520e. Referring to FIGS. 6A, 6B, and 7, the address detector 702 may determine whether the measured elevation corresponding to the device 602/602' corresponds with an elevation at a position (e.g., latitude/longitude coordinates) estimated for the device 602/602'. Referring to FIG. 8, the verification engine 808 may determine whether an elevation that is measured for the selected structure corresponds with an elevation for the estimated address 834, indicated in the regional information 820.

Figure 12C:
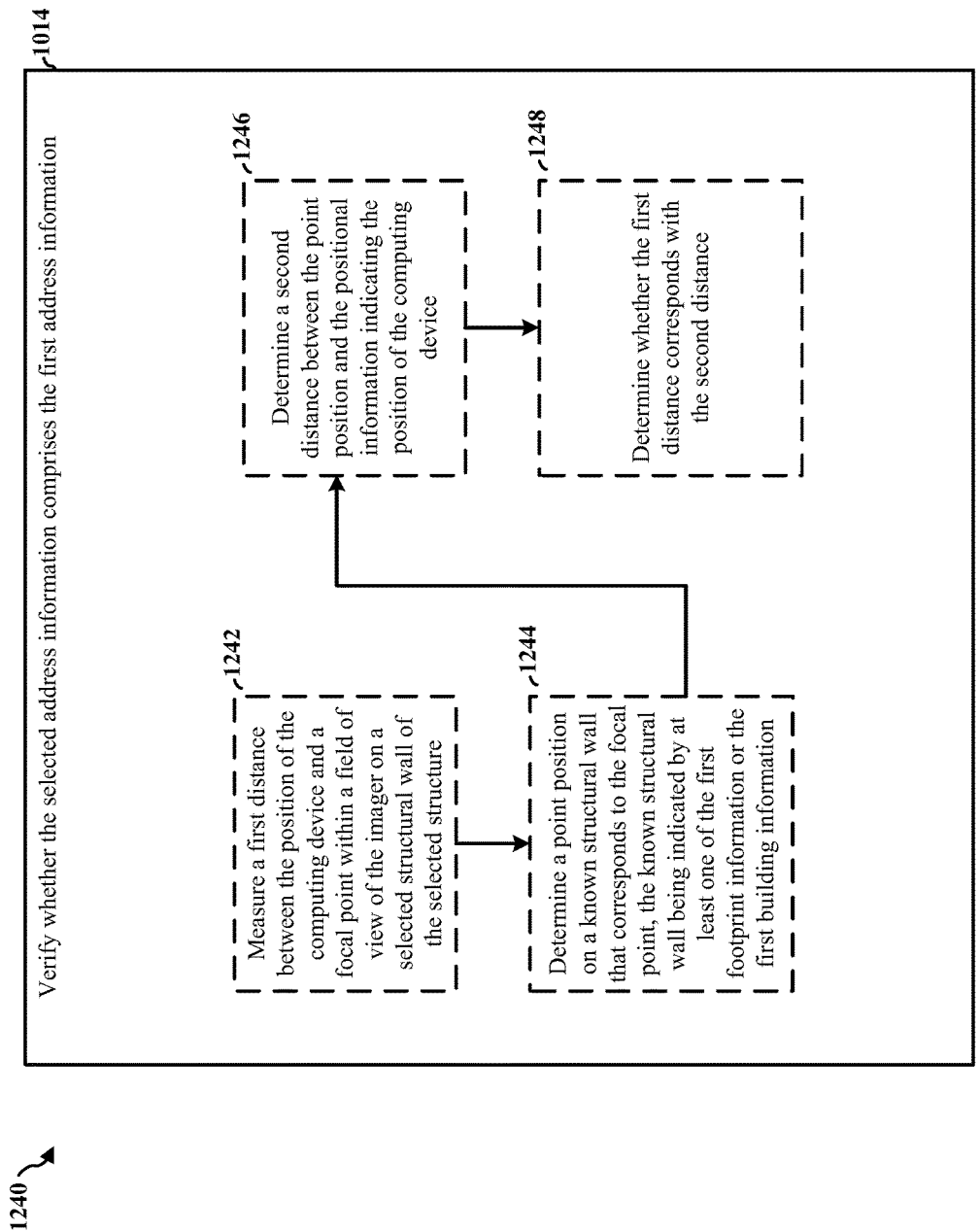

FIG. 12C illustrates a method 1240 that may be an aspect of operation 1014. That is, the verification of whether the selected address information comprises the first address information may be based on operations 1242, 1244, 1246, 1248. At operation 1242, the apparatus may measure a first distance between a position of the apparatus and a focal point within a field of view of an image of the apparatus. The focal point may be on a selected structural wall of the selected structure. For example, the apparatus may use AR to measure a first distance between the apparatus and a focal point at a wall at which a camera of the apparatus is directed. In one aspect, the apparatus may capture a plurality of images of the selected structural wall, and the apparatus may overlay gyroscope and/or accelerometer measurements on the plurality of images. The overlaid measurements on the plurality of images may indicate a distance.

Referring to FIGS. 3A, 3B, 4, and 5, the address detector 402 may determine a first distance between the position of the device 302/302' and a focal point within a field of view of the camera 410 on selected structural wall of the second structure 314b or third structure 314c that is at least partially within the line of sight 304/304'. Referring to FIGS. 6A, 6B, and 7, the AR component 726 may measure a first distance between a position of the device 602/602' and a focal point 614 within the field of view 612 of the camera 710 on the structural wall 620. Referring to FIG. 8, the verification engine 808 may measure a first distance between the position of the computing device and a focal point on a selected structural wall that is within the line of sight 830.

At operation 1244, the apparatus may determine a point position on a known structural wall that corresponds to the focal point. The point position may be the estimated latitudinal and longitudinal coordinates of the focal point, projected onto the selected structure represented in the building information and/or footprint information.

Referring to FIGS. 3A, 3B, 4, and 5, the address detector 402 may determine a point position on a known structural wall that corresponds to a focal point on the second structure 314b or third structure 314c. Referring to FIGS. 6A, 6B, and 7, the address detector 702 may determine a point position on a known structural wall that corresponds to the focal point 614, the known structural wall being indicated by at least one of footprint information and/or building information that corresponds to the structure 600. Referring to FIG. 8, the verification engine 808 may determine a point position on a known structural wall that corresponds to the focal point, and the known structural wall may be indicated by footprint information and/or the building information received in the regional information 820.

At operation 1246, the apparatus may determine a second distance between the point position and the positional information indicating the position of the computing device. For example, the second distance may be a difference between latitudinal and longitudinal coordinates of the point position (derived from the focal point) and latitudinal and longitudinal coordinates of the apparatus (obtained from GNSS).

Referring to FIGS. 3A, 3B, 4, and 5, the address detector 402 may determine a second distance between a point position and the position (e.g., position 308 or refined position 340) of the device 302/302'. Referring to FIGS. 6A, 6B, and 7, the address detector 702 may determine a second distance between a point position (derived from the focal point) and a position of the device 602/602' (e.g., geographic coordinates of the device 602/602'). Referring to FIG. 8, the verification engine 808 may determine a second distance between the point position and the positional information 832 indicating the position of the computing device.

At operation 1248, the apparatus may determine whether the first distance corresponds with the second distance. That is, the apparatus may determine whether the first distance matches the second distance within a threshold margin of error. If the first distance corresponds to the second distance, then the selected address information may be verified to include the first address information (e.g., the selected address information is accurate). Otherwise, the selected address information may be unverified.

Referring to FIGS. 3A, 3B, 4, and 5, the address detector 402 may determine whether the first distance corresponds with the second distance. Referring to FIGS. 6A, 6B, and 7, the address detector 702 may determine whether the first distance corresponds with the second distance. Referring to FIG. 8, the verification engine 808 may determine whether the first distance corresponds with the second distance.

Figure 12D:
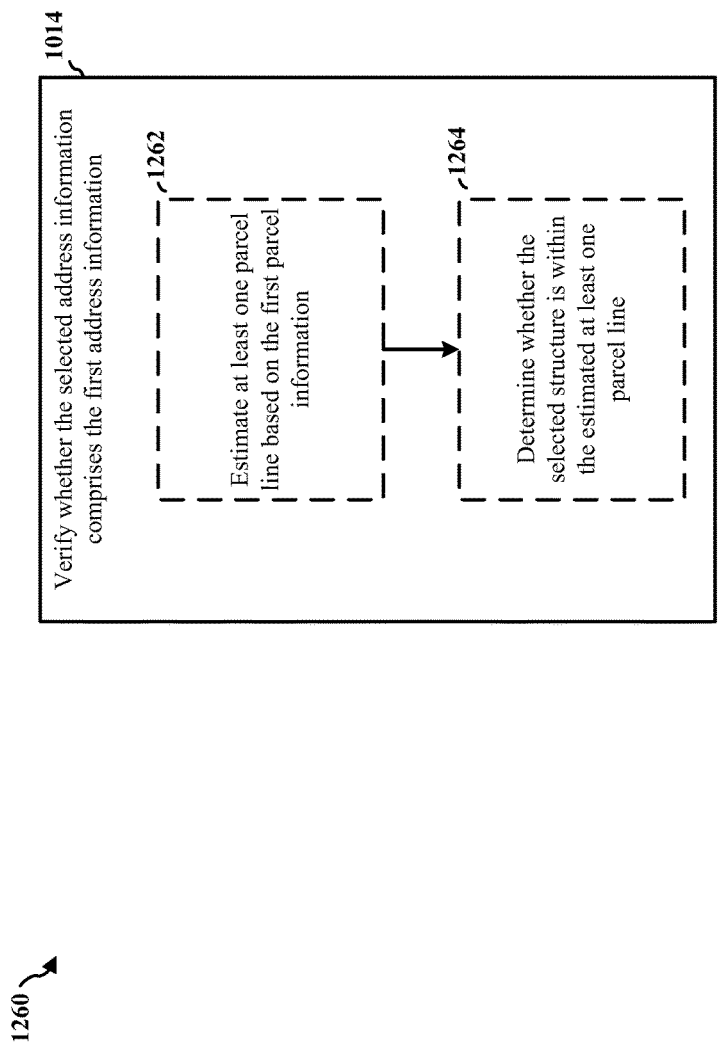

FIG. 12D illustrates a method 1260 that may be an aspect of operation 1014. That is, the verification of whether the selected address information comprises the first address information may be based on operations 1262 and 1264. At operation 1262, the apparatus may estimate at least one parcel line based on the first parcel information (e.g., obtained from the regional information).

Referring to FIGS. 3A, 3B, 4, and 5, the address detector 402 may estimate at least one parcel line estimated for the second parcel 310b or the third parcel 310c. Referring to FIG. 8, the verification engine 808 may estimate at least one parcel line (e.g., based on the positional information 832 and/or the regional information 820).

At operation 1264, the apparatus may determine whether the selected structure is within the estimated at least one parcel line. In one aspect, the apparatus may capture image data and estimate the at least one parcel line by overlaying the estimated at least one parcel line on the image data (e.g., to identify if the selected structure depicted in the image data is within the at least one parcel line represented in the image data). For example, if the selected structure is not within the estimated parcel line (e.g., no structure is within the estimated at least one parcel line) and/or a structure (e.g., the selected structure or another structure) is positioned on the estimated at least one parcel line, then the apparatus may determine that the verification has at least partially failed because the selected structure is not determined to be within the estimated at least one parcel line and/or a structure lies on the estimated at least one parcel line. If the selected structure is within the estimated at least one parcel line (and/or another structure is not located on the at least one parcel line) within a margin of error, then the selected address information may be verified to include the first address information (e.g., the selected address information is accurate). Otherwise, the selected address information may be unverified.

Referring to FIGS. 3A, 3B, 4, and 5, the address detector 402 may determine whether the second structure 314b is within the at least one parcel line estimated for the second parcel 310b or the third structure 314c is within the at least one parcel line estimated for the third parcel 310c. In addition, the address detector 402 may determine that no structures are located on a line of the second parcel 310b or a line of the third parcel 310c (e.g., a structure that falls on an estimated parcel line may indicate that the estimation is incorrect because parcel lines may be free from structures). Referring to FIG. 8, the verification engine 808 may determine whether the selected structure is within the estimated at least one parcel line.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." No claim element is to be construed under the provisions of 35 U.S.C. § 112(f), or analogous law, in any jurisdiction unless the element is expressly recited using the phrase "means for" or, in the case of a method claim, the element is recited using the phrase "step for."

What is claimed is:

1. A computing device, comprising:
   an imager configured to capture an image;
   an inertial measurement unit having an output; and
   a processing system configured to:
      collect positional information indicating a position of the computing device in response to the output from the inertial measurement unit;
      determine a selected structure captured in the image;
      identify information corresponding to the selected structure based on the positional information;
      send, to a remote server, at least a portion of the positional information indicating the position of the computing device;
      receive regional information associated with a first parcel associated with a first structure from the remote server based on the at least the portion of the positional information, the regional information indicating at least one of first parcel information indicating a geographic position associated with the first parcel, first footprint information indicating a geographic position associated with the first structure, first building envelope information associated with the first structure, a first elevation associated with the position of the computing device, a first geographic map that includes the first parcel, a first image that includes at least a portion of the first structure, or first address information associated with the first structure; and
      verify whether the identified information comprises the first address information based on the regional information, wherein the verification of whether the identified information comprises the first address information comprises to:
      measure a first distance between the position of the computing device and a focal point within a field of view of the imager on a selected structural wall of the selected structure;
      determine a point position on a known structural wall that corresponds to the focal point, the known structural wall being indicated by at least one of the first footprint information or the first building envelope information;
      determine a second distance between the point position and the positional information indicating the position of the computing device; and
      determine whether the first distance corresponds to the second distance, wherein the identified information comprises the first address information when the first distance is determined to correspond to the second distance.

2. The computing device of claim 1, wherein the positional information indicating the position of the computing device comprises at least one of geographic coordinates associated with the position of the computing device, a first orientation of the computing device relative to magnetic north, or a rotational orientation of the computing device.

3. The computing device of claim 2, wherein the collection of the positional information indicating the position of the computing device comprises at least one of to:
   receive the geographic coordinates associated with the position of the computing device using a Global Navigation Satellite System (GNSS) component of the computing device; or determine the geographic coordinates associated with the position of the computing device based on signals received from at least one WiFi access point (AP) over a WiFi network.

4. The computing device of claim 2, wherein the collection of the positional information indicating the position of the computing device comprises at least one of to:
determine the first orientation of the computing device relative to the magnetic north; or
determine the rotational orientation of the computing device.

5. The computing device of claim 2, wherein the determination of the selected structure that is proximate to the position of the computing device comprises to:
determine a line of sight that is orthogonal to a camera lens of the computing device based on at least one of the first orientation of the computing device or the rotational orientation of the computing device; and
identify the selected structure based on the line of sight.

6. The computing device of claim 1, wherein the verification of the identified information further comprises to:
estimate at least one parcel line based on the first parcel information;
determine whether the selected structure is within the estimated at least one parcel line,
wherein the identified information comprises the first address information when the selected structure is determined to be within the estimated at least one parcel line.

7. The computing device of claim 1, wherein the verification of the identified information further comprises to:
compare the image that includes at least a portion of the selected structure with the first image that includes at least a portion of the first structure; and
determine whether the at least the portion of the selected structure included in the image corresponds with the at least the portion of the first structure included in the first image,
wherein the identified information comprises the first address information when the at least the portion of the selected structure included in the image corresponds with the at least the portion of the first structure included in the first image.

8. The computing device of claim 1, wherein the verification of the identified information further comprises to:
compare a measured elevation associated with the computing device with the first elevation; and
determine whether the measured elevation corresponds with the first elevation,
wherein the identified information comprises the first address information when the measured elevation corresponds with the first elevation.

9. The computing device of claim 1, wherein the processing system is further configured to:
change the identified information when the identified information is unverified to comprise the first address information; and
determine whether the changed identified information comprises the first address information based on the regional information.

10. The computing device of claim 1, wherein the processing system is further configured to:
store, in memory of the computing device, at least a portion of the regional information,
wherein the regional information further indicates at least one of:
second parcel information indicating a second geographic position associated with a second parcel,
second footprint information indicating a second geographic position associated with a second structure of the second parcel,
second building envelope information associated with the second structure,
a second elevation associated with the position of the computing device,
a second geographic map that includes the second parcel,
a second image that includes at least a portion of the second structure, or
second address information associated with the second structure.

11. The computing device of claim 10, wherein the processing system is further configured to:
determine a second selected structure that is proximate to the position of the computing device; and
identify, based on the regional information and based on the positional information indicating the position of the computing device, second information corresponding to the second selected structure.

\* \* \* \* \*